US012634051B2

(12) United States Patent
Takeda et al.

(10) Patent No.: US 12,634,051 B2
(45) Date of Patent: May 19, 2026

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 199 days.

(21) Appl. No.: 16/345,569

(22) PCT Filed: Oct. 25, 2017

(86) PCT No.: PCT/JP2017/038418
§ 371 (c)(1),
(2) Date: Apr. 26, 2019

(87) PCT Pub. No.: WO2018/079571
PCT Pub. Date: May 3, 2018

(65) Prior Publication Data
US 2019/0253204 A1 Aug. 15, 2019

(30) Foreign Application Priority Data
Oct. 28, 2016 (JP) ................................. 2016-212065

(51) Int. Cl.
*H04W 28/04* (2009.01)
*H04L 1/16* (2023.01)
(Continued)

(52) U.S. Cl.
CPC .............. *H04L 1/1861* (2013.01); *H04L 1/16* (2013.01); *H04L 1/1657* (2013.01);
(Continued)

(58) Field of Classification Search
CPC ....... H04L 1/16; H04L 1/1657; H04L 1/1854; H04L 1/1861; H04L 1/1864; H04L 1/189; H04W 28/04; H04W 72/0413
See application file for complete search history.

(56) References Cited

U.S. PATENT DOCUMENTS

2013/0301586 A1* 11/2013 Fan ........................ H04L 1/1607
370/329
2016/0036578 A1 2/2016 Malladi et al.
(Continued)

FOREIGN PATENT DOCUMENTS

CN 102801490 A 11/2012
CN 104283651 A 1/2015
(Continued)

OTHER PUBLICATIONS

Extended European Search Report issued in Application No. 17865862. 1, mailed on May 26, 2020 (7 pages).
(Continued)

*Primary Examiner* — Derrick W Ferris
*Assistant Examiner* — M Mostazir Rahman
(74) *Attorney, Agent, or Firm* — Osha Bergman Watanabe & Burton LLP

(57) ABSTRACT
To properly perform retransmission control in future radio communication systems, a user terminal according to one aspect of the present invention is provided with a receiving section that receives a downlink (DL) signal comprised of a transport block including a plurality of code blocks, and a control section that controls transmission of receipt confirmation information to the DL signal, where even in the case where transmission of the receipt confirmation information for each code block is configured, the control section controls transmission of the receipt confirmation information for each transport block, based on downlink control information
(Continued)

(DCI) for scheduling the DL signal or payload of an uplink (UL) signal.

5 Claims, 17 Drawing Sheets

(51) Int. Cl.

| | |
|---|---|
| *H04L 1/1607* | (2023.01) |
| *H04L 1/1829* | (2023.01) |
| *H04L 1/1867* | (2023.01) |
| *H04W 72/21* | (2023.01) |

(52) U.S. Cl.
CPC ............ *H04L 1/1864* (2013.01); *H04L 1/189* (2013.01); *H04W 28/04* (2013.01); *H04W 72/21* (2023.01)

(56) References Cited

U.S. PATENT DOCUMENTS

| | | | | |
|---|---|---|---|---|
| 2016/0226643 | A1* | 8/2016 | Mallik | H04L 1/1819 |
| 2016/0233999 | A1* | 8/2016 | Chendamarai Kannan | |
| | | | | H04W 72/0406 |
| 2016/0285589 | A1* | 9/2016 | Mukkavilli | H04L 1/0045 |
| 2017/0207895 | A1* | 7/2017 | Yang | H04L 5/0048 |
| 2017/0294990 | A1 | 10/2017 | Xu et al. | |
| 2018/0070341 | A1* | 3/2018 | Islam | H04L 5/0064 |
| 2019/0020445 | A1* | 1/2019 | Kim | H04L 1/0071 |
| 2019/0191487 | A1* | 6/2019 | Kwon | H04L 1/1864 |
| 2019/0335536 | A1* | 10/2019 | Kwon | H04W 88/06 |
| 2020/0099499 | A1* | 3/2020 | Yeo | H04L 1/0009 |
| 2022/0286227 | A1* | 9/2022 | Guan | H04L 1/08 |

FOREIGN PATENT DOCUMENTS

| | | |
|---|---|---|
| CN | 104301077 A | 1/2015 |
| CN | 105515719 A | 4/2016 |
| EP | 2913591 A1 | 9/2015 |
| EP | 2913951 A1 | 9/2015 |
| WO | 2010109521 A1 | 9/2010 |
| WO | 2016021957 A1 | 2/2016 |

OTHER PUBLICATIONS

3GPP TSG-RAN WG1 #86; R1-1610179; "UCI content;" Qualcomm Incorporated; Oct. 10-14, 2016; Lisbon, Portugal (2 pages).

3GPP TSG-RAN WG1 #86-BIS; R1-1609744; "HARQ operation for large transport block sizes;" Nokia, Alcatel-Lucent Shanghai Bell; Oct. 10-14, 2016; Lisbon, Portugal (5 pages).

Office Action in counterpart Chinese Application No. 201780078314.5 mailed Jul. 22, 2021 (15 pages).

Office Action in counterpart Japanese Patent Application No. 2018-547698 issued on Jan. 5, 2022 (8 pages).

Ericsson; "Introduction of NB-IoT UE capabilities"; 3GPP TSG-RAN2 Meeting NB-IoT Adhoc, R2-163273; Sophia, Antipolis; May 3-4, 2016 (41 pages).

Office Action in counterpart European Application No. 17865862.1 mailed Dec. 7, 2021 (5 pages).

Office Action issued in the counterpart Japanese Application No. 2022-150805, mailed Nov. 7, 2023 (6 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

Huawei, HiSilicon; "Remaining issues for dynamic HARQ-ACK codebook determination"; 3GPP TSG RAN WG1 Meeting #83 R1-156452; Anaheim, USA, Nov. 15-22, 2015 (9 pages).

International Search Report issued for PCT/JP2017/038418, mailed Jan. 23, 2018 (5 pages).

Written Opinion issued for PCT/JP2017/038418, mailed Jan. 23, 2018 (4 pages).

Office Action issued in corresponding Canadian Application No. 3,041,977, mailed Mar. 28, 2024 (7 pages).

* cited by examiner

USER TERMINAL AND RADIO COMMUNICATION METHOD

TECHNICAL FIELD

The present invention relates to a user terminal and radio communication method in the next-generation mobile communication system.

BACKGROUND ART

In UMTS (Universal Mobile Telecommunications System) networks, for the purpose of higher data rates, low delay and the like, Long Term Evolution (LTE) has been specified (Non-patent Document 1). Further, for the purpose of wider bands and higher speed than LTE (also referred to as LTE Rel.8 or 9), LTE-A (LTE-Advanced, also referred to as LTE Rel.10~13, etc.) has been specified, and successor systems (e.g., also referred to as FRA (Future Radio Access), 5G (5th generation mobile communication system), NR (New RAT: Radio Access Technology), also referred to as LTE Rel.14~, etc.) to LTE have been studied.

In the existing LTE system (e.g., prior to Rel.13), as link adaptation, Adaptive Modulation and Coding (AMC) is performed where at least one of a modulation scheme, transport block size (TBS), and coding rate is adaptively varied. Herein, the TBS is a size of a transport block (TB) that is a unit of an information bit sequence. One or a plurality of TBs is allocated to one subframe.

For example, on downlink (DL), based on a channel quality indicator (CQI) sent back from a user terminal as feedback, the radio base station determines MCS (Modulation and Coding Scheme) indicative of a modulation scheme (modulation order) and TBS index of a DL signal (e.g., downlink shared channel (PDSCH: Physical Downlink Shared Channel)). Based on the TBS index indicated by the MCS index, and the number of resource blocks (e.g., physical resource block (PRB)) allocated to the DL signal, the radio base station determines the TBS of the DL signal.

On DL, it is desirable that the TBS (or, MCS index used in determination of the TBS) is determined so that the coding rate of the DL signal does not exceed "0.931". Herein, for example, the coding rate is obtained by dividing the number of information bits including CRC (Cyclic Redundancy Check) bits by the number of bits usable in the PDSCH. For example, in a subframe for configuring a measurement reference signal (CSI-RS: Channel State Information-Reference Signal) of channel state information (CSI), since the number of radio resources (e.g., Resource Element (RE)) usable in the PDSCH is limited, even when the radio base station determines an MCS index indicative of a large TBS index value to notify a user terminal, the user terminal skips decoding of the PDSCH.

On the other hand, on uplink (UL), a user terminal determines the TBS of a UL signal, based on the MCS index designated from the radio base station and the number of resource blocks allocated to the UL signal.

Further, in the existing LTE system, retransmission control (HARQ: Hybrid Automatic Repeat reQuest) of DL signal and UL signal is performed in a TB unit the size (TBS) of which is determined as described above. Specifically, in the existing LTE system, even in the case where the TB is divided into a plurality of code blocks (CB: Code Block), receipt confirmation information (also referred to as ACK (Acknowledge) or NACK (Negative ACK) (hereinafter, abbreviated as A/N), HARQ-ACK, etc.) is transmitted in a TB unit.

CITATION LIST

Non Patent Literature

[Non-patent Document 1] 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April, 2010

SUMMARY OF INVENTION

Technical Problem

In future radio communication systems (e.g., 5G, NR, etc.), for example, in order to support high speed and high capacity communication (eMBB: enhanced Mobile Broad Band), it is expected to also use a transport block size (TBS) larger than in the existing LTE system. It is expected that the transport block (TB) of such a large TBS is segmented into many code blocks (CB) (e.g., several tens of CBs per TB).

Thus, in the future radio communication system for expecting that the number of code blocks increases per transport block, as in the existing LTE system, in the case of performing retransmission control in a transport block unit, as a result of occurrence of retransmission of a code block where any error is not detected, there is the risk that performance (throughput) degrades. Accordingly, desired is retransmission control suitable for the future radio communication system.

The present invention was made in view of such a respect, and it is an object of the invention to provide a user terminal and radio communication method capable of properly performing retransmission control in future radio communication systems.

Solution to Problem

A user terminal according to one aspect of the present invention is characterized by being provided with a receiving section that receives a downlink (DL) signal comprised of a transport block including a plurality of code blocks, and a control section that controls transmission of receipt confirmation information to the DL signal, where even in the case where transmission of the receipt confirmation information for each code block is configured, the control section controls transmission of the receipt confirmation information for each transport block, based on downlink control information (DCI) for scheduling the DL signal or payload of an uplink signal.

Advantageous Effects of Invention

According to the present invention, it is possible to properly perform retransmission control in future radio communication systems.

DESCRIPTION OF EMBODIMENTS

Figure 1:
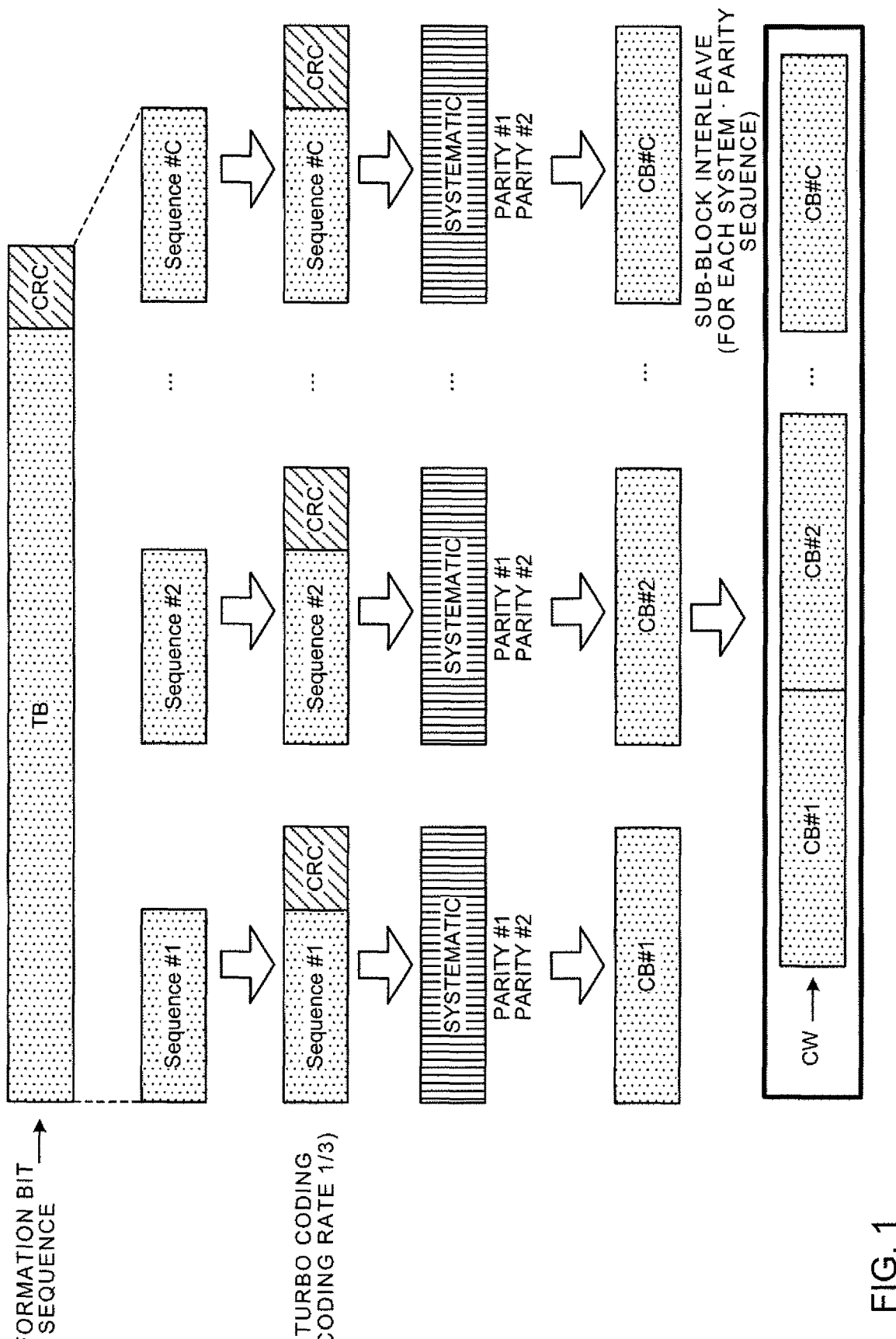
FIG. 1 is a diagram showing one example of transmission processing in the case where code block segmentation is applied.

FIG. 1 is a diagram showing one example of transmission processing in the case where code block segmentation is applied. The code block segmentation is to segment a transport block (hereinafter, abbreviated as TB) into a plurality of segments, in the case where the TB with CRC bits added (information bit sequence including the CRC bit) exceeds a predetermined threshold (e.g., 6144 bits). For example, the code block segmentation is performed to match the TBS with a size which a coder supports, and the above-mentioned threshold may be equal to the maximum size which a coder supports.

As shown in FIG. 1, in the case where the TB size (TBS) exceeds a predetermined threshold (e.g., 6144 bits) on the transmission side, the information bit sequence including the CRC bit is segmented into a plurality of segments. In addition, a filler bit may be added to the beginning of segment #1.

As shown in FIG. 1, CRC bits (e.g., 24 bits) are added to each segment, and channel coding (e.g., turbo coding) is performed with a predetermined coding rate (e.g., ⅓). By turbo coding, systematic bits, and first and second parity bits (#1 and #2) are generated as code bits of each code block (hereinafter, abbreviated as CB).

Each of the sequence of the systematic bit, sequence of the first parity bit and sequence of the second parity bit is independently subjected to interleaving (sub-block interleaving), and is input to buffer (circular buffer). Based on the number of REs usable in the allocated resource block, and redundancy version (RV), code bits of each CB are selected from the buffer (rate matching).

Each CB comprised of selected code bits is coupled as a code word (CW). Scrambling, data modulation and the like are performed on the code word to transmit.

Figure 2:
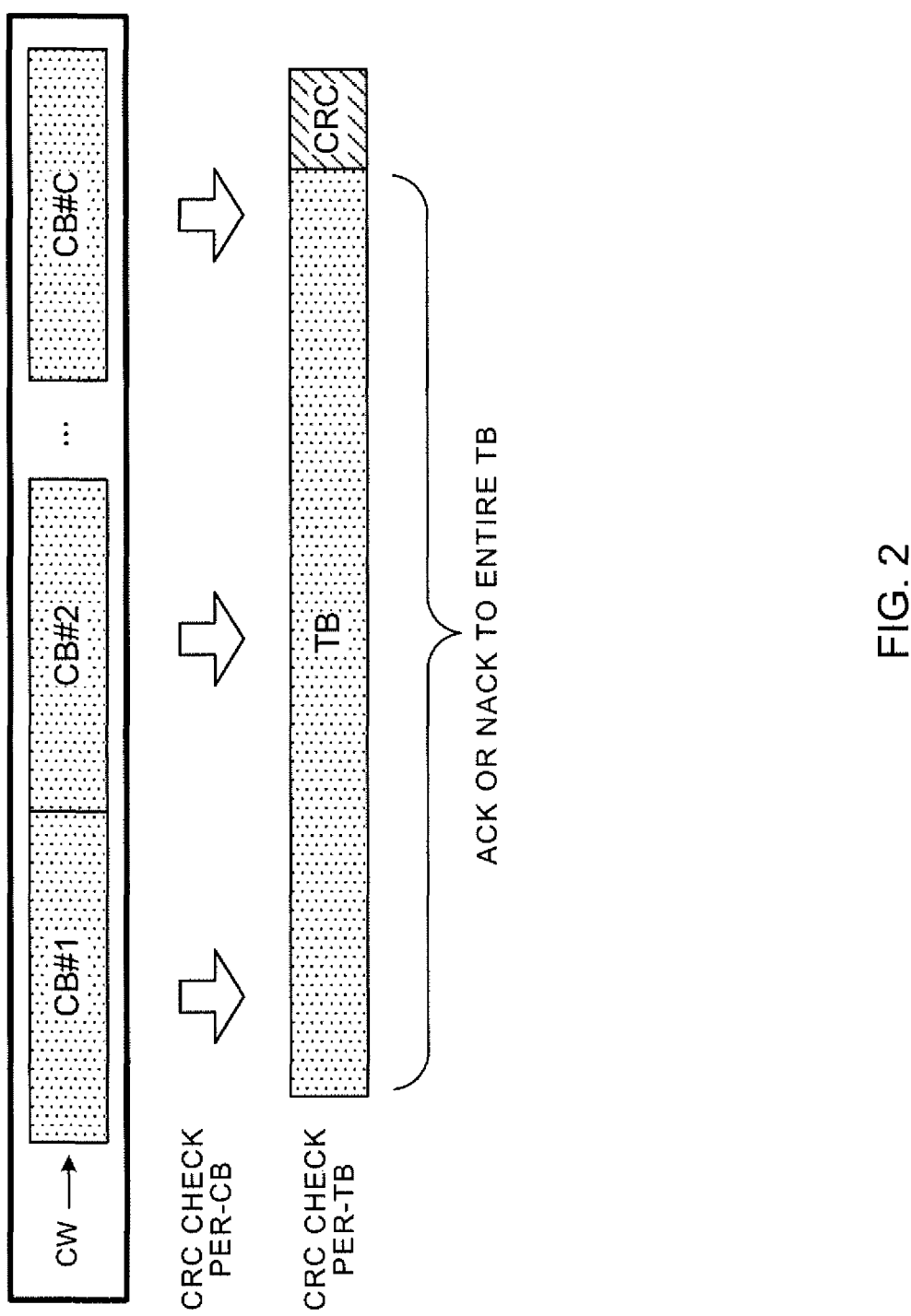
FIG. 2 is a diagram showing one example of reception processing in the case where code block segmentation is applied.

FIG. 2 is a diagram showing one example of reception processing in the case where code block segmentation is applied. On the reception side, based on the TBS index, and the number of allocated resource blocks (e.g., PRB: Physical Resource Block), the TBS is determined, and based on the TBS, the number of CBs is determined.

As shown in FIG. 2, on the reception side, each CB is decoded, and using CRC bits added to each CB, error detection is performed on each CB. Further, the side undoes code block segmentation to restore the TB. Furthermore, using CRC added to the TB, error detection is performed on the entire TB.

On the reception side in the existing LTE system, corresponding to an error detection result of the entire TB, receipt confirmation information (ACK or NACK, hereinafter, abbreviated as A/N, also referred to as HARQ-ACK) to the entire TB is transmitted to the transmission side. In response to NACK from the reception side, the transmission side retransmits the entire TB.

Figure 3:
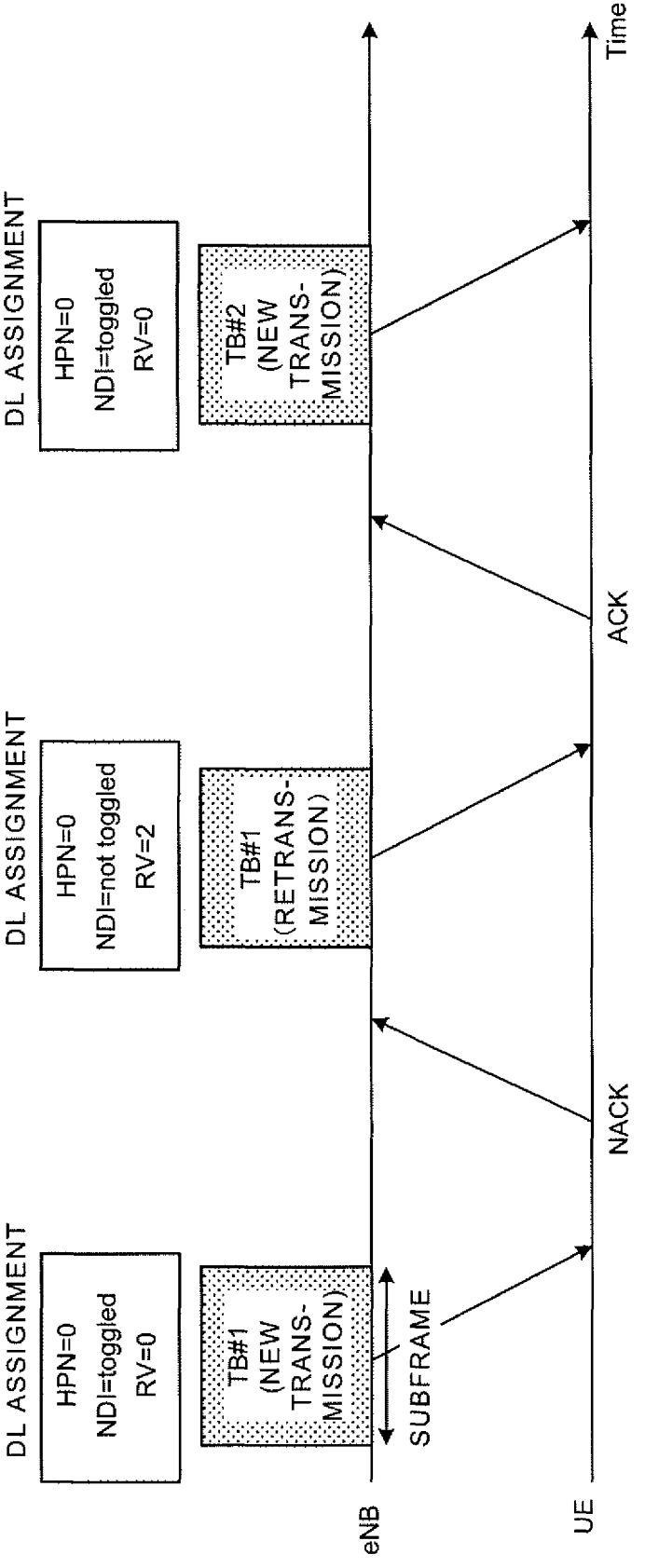
FIG. 3 is a diagram showing one example of retransmission control of DL in the existing LTE system.

FIG. 3 is a diagram showing one example of retransmission control of DL signal in the existing LTE system. In the existing LTE system, irrespective of whether or not the TB is segmented into a plurality of CBs, retransmission control is performed in a TB unit. Specifically, HARQ process is assigned for each TB. Herein, the HARQ process is a processing unit of retransmission control, and each HARQ process is identified by the HARQ process number (HPN). One or more HRAR processes are configured for a use terminal (UE: User Equipment), and in the HARQ process of the same HPN, the same data is retransmitted until ACK is received.

For example, in FIG. 3, HPN=0 is assigned to TB#1 of new (first) transmission. When the radio base station (eNB: eNodeB) receives NACK, the station retransmits the same TB#1 in HPN=0. When the station receives ACK, the station transmits next TB#2 in HPN=0.

Further, the radio base station is capable of including the above-mentioned HPN, new data indicator (NDI), and redundancy version (RV) in downlink control information (DCI) (DL assignment) to assign a DL signal (e.g., PDSCH) for transmitting the TB.

Herein, the NDI is an indicator indicative of new transmission or retransmission. For example, in the same HPN, the case where the NDI is not toggled (the same value as the last) indicates retransmission, and the case where the NDI is toggled (different value from the last) indicates new transmission.

Further, the RV indicates a difference in redundancy of transmission data. For example, a value of the RV is "0", "1", "2" and "3", and "0" is used in new transmission with the lowest degree of redundancy. By applying a different RV value for each transmission in the same HPN, it is possible to effectively acquire gain of HARQ, For example, in FIG. 3, DCI in new transmission of TB#1 includes HPN "0", the toggled NDI, and RV value "0".

Therefore, the user terminal is capable of recognizing that HPN "0" is new transmission, and decodes TB#1 based on the RV value "0". On the other hand, DCI in retransmission of TB#1 includes HPN "0", NDI that is not toggled, and RV value "2". Therefore, the user terminal is capable of recognizing that HPN "0" is retransmission, and decodes TB#1 based on the RV value "2". New transmission of TB#2 is the same as new transmission of TB#1.

As described above, in the existing LTE system, irrespective of whether or not code block segmentation is applied, retransmission control is performed in a TB unit. Therefore, in the case of code block segmentation is applied, even when errors are tilted to a part of C (C>1) CBs configured for segmenting the TB, the entire TB is retransmitted. Accordingly, not only the CB with the error detected, but also CBs without errors being detected are retransmitted, and there is the risk that performance (throughput) degrades.

Particularly, in future radio communication systems (e.g., 5G, NR, etc.), since expected is communication (eMBB) with higher speed and higher capacity than in the existing LTE system, it is expected that the case where the TB is segmented into many CBs (e.g., several tens of CBs) increases. In this case, there is the risk that efficient retransmission control is not performed.

Therefore, the inventors of the present invention conceived improving performance (throughput) in future radio communication systems, by performing retransmission control in a unit (e.g., unit of CB or code block group (CBG) obtained by grouping a plurality of CBs) smaller than the TB, as one aspect of the invention.

One Embodiment of the present invention will be described below in detail with reference to drawings. In addition, hereinafter, in this Embodiment, descriptions will be made with asynchronous retransmission control (asynchronous HARQ) assumed, but this Embodiment is also applicable to synchronous retransmission control (synchronous HARQ) as appropriate. In synchronous HARQ, retransmission of each HARQ process is performed a certain period later after new transmission. On the other hand, in asynchronous HARQ, retransmission of each HARQ process is performed a non-certain period later after new transmission of the UL data.

Further, in this Embodiment, as a DL signal, a DL shared channel (e.g., PDSCH: Physical Downlink Shared Channel) is assumed, but the invention is not limited thereto. For example, retransmission control of this Embodiment is also applicable to retransmission control of random access response (RAR) and the like. Further, this Embodiment describes retransmission control of the DL signal, but is also applicable to UL signals of a UL shared channel (e.g., PUSCH: Physical Uplink Shared Channel) and the like as appropriate.

Furthermore, the transport block (TB) in this Embodiment is a unit of information bit sequence, and for example, may be at least one of a unit of information bit sequence assigned to one subframe, and a unit of scheduling. Furthermore, the TB may include the CRC bit, or may not include the CRC bit.

Still furthermore, the code block (CB) in this Embodiment is a unit of information bits capable of being input to a coder (e.g., turbo coder). In the case where the TBS is a support size (maximum coding size) of a coder or less, the TB may be called the CB. Further, in the case where the TBS exceeds the support size of a coder, the TB may be segmented into a plurality of segments, and each segment may be called the CB.

Moreover, a segment group obtained by grouping a plurality of segments (CBs) lower than the number of segments (CBs) per TB may be called the code block group (CBG). Hereinafter, retransmission control for each CB will be described, but retransmission control for each CB may be replaced with for each CBG, or retransmission control may be performed both for each CB and for each CBG.

(Aspect 1)

Aspect 1 describes semi-static control of transmission unit (also referred to as resolution, etc.) of A/N to a DL signal. The DL signal is comprised of one or more TBs, and each TB may include one or more CBs. Further, in the following description, for convenience, it is assumed that scheduling is performed in one TB unit, but the invention is not limited thereto. For example, MIMO for space multiplexing a plurality of TBs in the same time • frequency may be applied, and carrier aggregation (CA) for frequency multiplexing a plurality of TBs into different carriers may be applied. In these cases, scheduling is performed in a unit of a plurality of TBs.

As a transmission unit of A/N to a DL signal, for example, a plurality of units is expected such as for each CB, for each TB, and for each plurality of TBs subjected to bundling. In Aspect 1, one of the plurality of transmission units is semi-statically configured for a user terminal.

Figure 4:
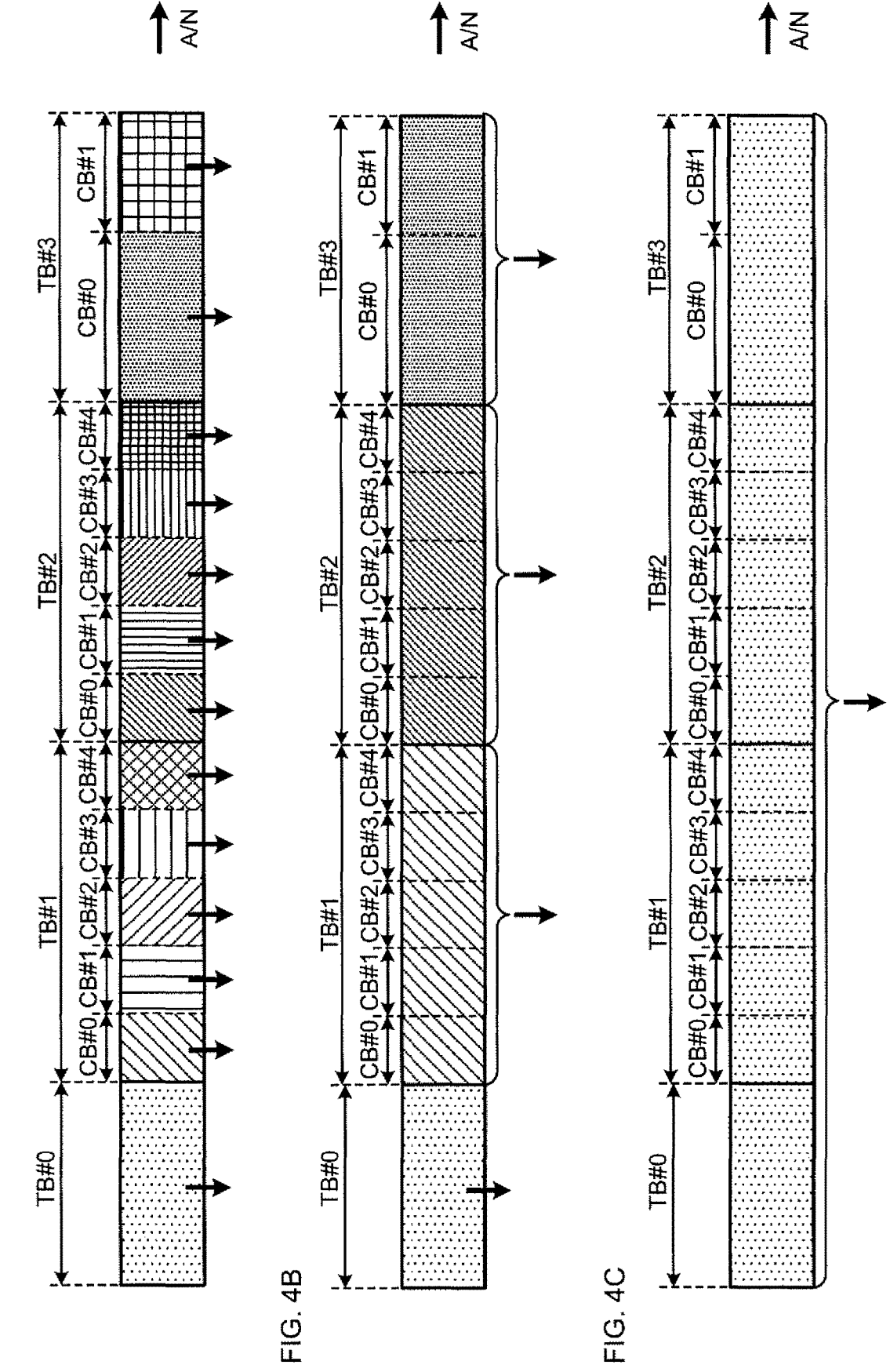
FIGS. 4A to 4C are diagrams showing control examples of transmission unit of A/N according to Aspect 1.

FIG. 4 contains diagrams showing control examples of transmission unit of A/N according to Aspect 1. As one example, FIGS. 4A to 4C illustrate four TBs#0 to #3. Further, TB#0 is comprised of a single CB. Each of TB#1 and TB#2 is comprised of five CBs#0 to #4. TB#3 is comprised of two CBs#0 and #1.

In addition, the configuration of each TB shown in FIGS. 4A to 4C is one example, and is not limited thereto. The number of CBs per TB may be determined based on at least one of the TBS, predetermined threshold (e.g., 6144 bits, may be a value based on the maximum size supported by a coder), and the number of CRC bits (e.g., 24 bits).

FIG. 4A shows one example of transmission control (also referred to as CB-based HARQ-ACK, etc.) of A/N for each CB. In FIG. 4A, a user terminal performs error detection of each CB, using CRC bits added to each CB. Based on an error detection result of each CB, the user terminal generates a bit (hereinafter, also referred to as the A/N bit, HARQ-ACK bit, etc.) indicative of A/N for each CB to transmit to the radio base station as feedback. For example, in FIG. 4A, A/N bits of total 13 bits are transmitted as feedback, including 1 bit in TM#0, 5 bits in each of TBs#1 and #2, and 2 bits in TB#3.

Each CB or CBG may be mapped to one or a plurality of symbols in a time period (data scheduling unit (may be also called Transmission Time Interval (TTI), slot, mini-slot, subframe or the like) comprised of a plurality of symbols) in which the TB including the CB or CBG is transmitted/received, and different CBs or CBGs are mapped to different symbols in the same time period. In this case, since the CB or CBG constituting the same TB is subjected to time multiplexing on a symbol-by-symbol basis, it is possible to perform signal processing such as coding • decoding of the CB or CBG on a symbol-by-symbol basis.

Further, when the TB is mapped to a plurality of symbols constituting a slot, each of CBs or CBGs constituting the TB may be mapped to a mini-slot included in the slot. For example, it is possible to map one CB or CBG to one mini-slot, and to map different CBs or CBGs to different mini-slots. For example, in the case where a slot is comprised of 14 OFDM symbols, and a mini-slot is comprised of 2 OFDM symbols, each slot includes 7 mini-slots. In this case, it is possible to segment the TB into 7 CBs or CBGs at the maximum.

As shown in FIG. 4A, in the case of transmitting the A/N bit for each CB as feedback, feedback of A/N of the DL signal is made in higher resolution than in the existing LTE system (e.g., prior to Rel.13). As a result, as compared with the existing LTE system, system performance is higher, but there is the risk that overhead of UL increases.

FIG. 4B shows one example of retransmission control (also referred to as TB-based HARQ-ACK, etc.) of A/N for each TB. In FIG. 4B, a user terminal restores each TB from one or more CBs, and using CRC added to each TB, performs error correction of each TB. Based on an error detection result of each TB, the user terminal generates an A/N bit for each TB to transmit to the radio base station as feedback. For example, in FIG. 4B, A/N bits of total 4 bits are transmitted as feedback, including 1 bit in each of TBs#0 to TB#3.

In FIG. 4B, feedback of A/N of the DL signal is made in lower resolution than in FIG. 4A. As a result, as compared with retransmission control per-CB, system performance deteriorates, but it is possible to prevent overhead of UL from increasing.

FIG. 4C shows one example of transmission control (also referred to as HARQ-ACK bundling, etc.) of A/N for each plurality of TBs subjected to bundling. In FIG. 4C, based on an error detection result of a plurality of TBs subjected to bundling, the user terminal generates one A/N bit for the entire plurality of TBs to transmit to the radio base station as feedback. For example, in FIG. 4C, the A/N bit of 1 bit is transmitted as feedback in the entire TBs#0 to #3.

In FIG. 4C, feedback of A/N of the DL signal is made in further lower resolution than in FIG. 4B. As a result, since overhead of UL is decreased, this case is effective in securing coverage and/or capacity of UL.

As described above, in Aspect 1, a plurality of transmission units with different degrees of resolution is expected in A/N of the DL signal. Therefore, one of the plurality of transmission units may be configured for a user terminal (semi-statically). For example, the user terminal may receive information (transmission unit information) indicative of one of the plurality of transmission units by higher layer signaling.

In Aspect 1, as a transmission unit of A/N of the DL signal, a plurality of transmission units with different degrees of resolution is provided, and one of the plurality of transmission units is configured semi-statically. Accordingly, it is possible to flexibly perform retransmission control with resolution corresponding to a requirement.

(Aspect 2)

Aspect 2 describes dynamic control of transmission unit of A/N to a DL signal. As described in Aspect 1, in transmission control of A/N for each CB, as the number of CBs per TB increases, the number of A/N bits increases. For example, in the case where one TB is comprised of 16 CBs, A/N bits of 16 bits are required for a DL signal scheduled by a single piece of DCI.

Particularly, in future radio communication systems, it is expected to dynamically control feedback timing of A/N (also referred to as flexible HARQ-ACK feedback timing, etc.). In this case, it is expected to make feedback of A/N of a plurality of TBs (a plurality of slots, a plurality of subframes, a plurality of transmission Time Intervals (TTIs), etc.) by single UL transmission. In the case of generating an A/N bit for each CB in a plurality of TBs, the number of A/N bits further increases.

Therefore, in the future radio communication system, there is the risk that a radio base station is capable of configuring transmission of A/N for each CB for a user terminal only in the case where UL coverage is secured for the maximum number of A/N bits, and the payload of a UL signal (particularly, UL control channel, e.g., PUCCH: Physical Uplink Control Channel) is not limited. As a result, limitations are imposed on configuration of transmission of A/N for each CB.

Therefore, in Aspect 2, even in the case where transmission of A/N for each CB is configured for a user terminal semi-statically, by dynamically controlling the transmission unit of A/N, limitations on the configuration of transmission of A/N for each CB are reduced. The dynamic control of transmission unit of A/N may be performed based on explicit or implicit instructions from a radio base station (first dynamic control), or may be performed autonomously in a user terminal (second dynamic control).

<First Dynamic Control>

In first dynamic control, even in the case where transmission of A/N for each CB is configured for a user terminal, the user terminal dynamically controls the transmission unit of A/N to a DL signal, based on DCI (DL assignment) for scheduling the DL signal. The dynamic control may be performed based on explicit instructions by the DCI, or may be performed based on implicit instructions.

«Explicit Instructions»

In the case of explicit instructions, DCI may include information (dynamic control information) used in dynamic control of transmission unit of A/N. For example, the dynamic control information may be a bit field indicating whether the transmission unit of A/N is a TB-by-TB basis, or a CB-by-CB basis (or whether or not the unit is a CB-by-CB basis, or whether or not the unit is a TB-by-TB basis.) Further, the bit field is essentially one bit or more.

Figure 5:
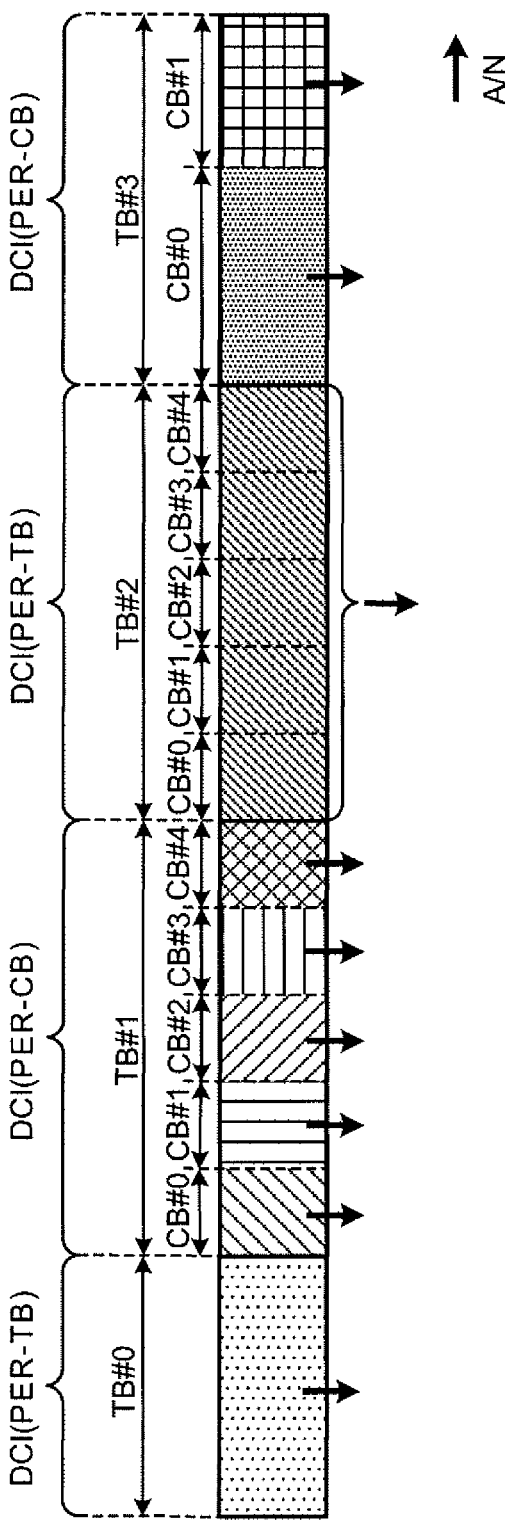
FIG. 5 is a diagram showing one example of dynamic control of transmission unit of A/N according to Aspect 2.

FIG. 5 is a diagram showing one example of dynamic control of transmission unit of A/N according to Aspect 2. In FIGS. 5 to 9, as in FIGS. 4A to 4C, it is assumed that TBs#0 to #3 are configured, but the invention is not limited thereto. Further, in FIGS. 5 to 9, descriptions will be made using the case of scheduling a single TB by single DCI as an example, but one or more TBs may be scheduled by single DCI. Furthermore, in FIGS. 5 to 9, it is assumed that transmission of A/N for each CB is configured for a user terminal by higher layer signaling.

For example, in FIG. 5, since the dynamic control information inside DCI for scheduling TB#1 indicates a CB-by-CB basis (per-CB), the user terminal transmits A/N bits of 5 bits that respectively correspond to CBs#0 to #4 constituting TB#1 as feedback. Similarly, since the dynamic control information inside DCI for scheduling TB#3 also indicates per-CB, the user terminal transmits A/N bits of 2 bits that correspond to CBs#0 and #1 constituting TB#3 as feedback.

On the other hand, in FIG. 5, since the dynamic control information inside DCI for scheduling TB#2 indicates a TB-by-TB basis (per-TB), the user terminal transmits an A/N bit of 1 bit that corresponds to TB#2 as feedback.

In addition, for TB#0 comprised of 1 CB, irrespective of whether the dynamic control information inside DCI for scheduling TB#0 indicates a CB-by-CB basis or TB-by-TB basis, the user terminal may transmit an A/N bit of 1 bit that corresponds to TB#1 to the radio base station as feedback.

In FIG. 5, since the transmission unit of A/N is explicitly indicated by the dynamic control information inside DCI, even in the case where transmission of A/N for each CB is configured semi-statically, the user terminal is capable of performing the dynamic control of transmission unit of A/N with ease.

«Implicit Instructions»

In the case of implicit instructions, a user terminal may determine the transmission unit of A/N, based on search space where the DCI is disposed and/or aggregation level of control channel element (CCE) where the DCI is disposed.

For example, even in the case where transmission of A/N for each CB is configured, when the DCI is detected in common search space, the user terminal may determine the transmission unit of A/N for each TB. Further, when the aggregation level of CCE is a predetermined value or more, the user terminal may determine the transmission unit of A/N for each TB.

When the transmission unit of A/N is implicitly indicated based on the DCI, even in the case where transmission of A/N for each CB is configured semi-statically, the user terminal is capable of performing the dynamic control of transmission unit of A/N, without increasing overhead of the DCI.

<Second Dynamic Control>

In second dynamic control, even in the case where transmission of A/N for each CB is configured for a user terminal, the user terminal dynamically controls the transmission unit of A/N to a DL signal, based on the payload of a UL signal (e.g., PUCCH).

A radio base station indicates, to a user terminal, radio resources (hereinafter, referred to as PUCCH resources) for PUCCH and/or format (hereinafter, referred to as PUCCH format) of PUCCH. The payload of the UL signal is determined based on the PUCCH resources and/or PUCCH format.

When the number of bits of A/N for each CB does not exceed the payload of the UL signal, the user terminal transmits A/N for each CB. On the other hand, even in the case where transmission of A/N for each CB is configured, when the number of bits of A/N for each CB exceeds the payload of the UL signal, on at least one of TBs, the user terminal changes the transmission unit of A/N from for each CB to for each TB.

The priority for changing the transmission unit to per-TB may be determined based on the TBS. For example, the transmission unit of A/N may be changed to per-TB starting with the TB of large TBS. Alternatively, the transmission unit of A/N may be changed to per-TB starting with the TB of small TBS.

Figure 6A:
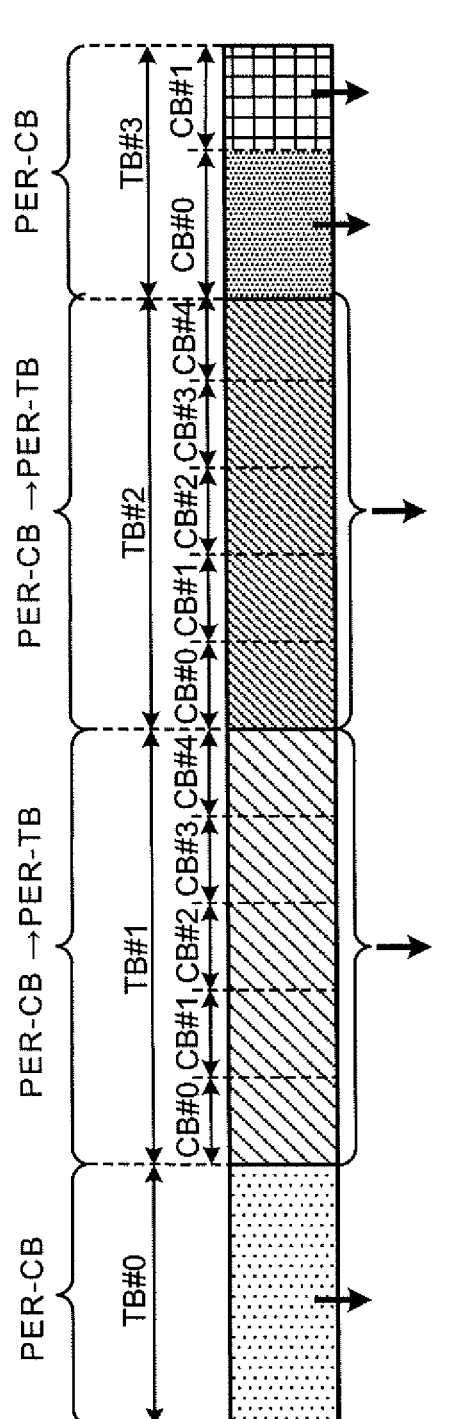
FIGS. 6A and 6B are diagrams showing another example of dynamic control of transmission unit of A/N according to Aspect 2.
Figure 6B:
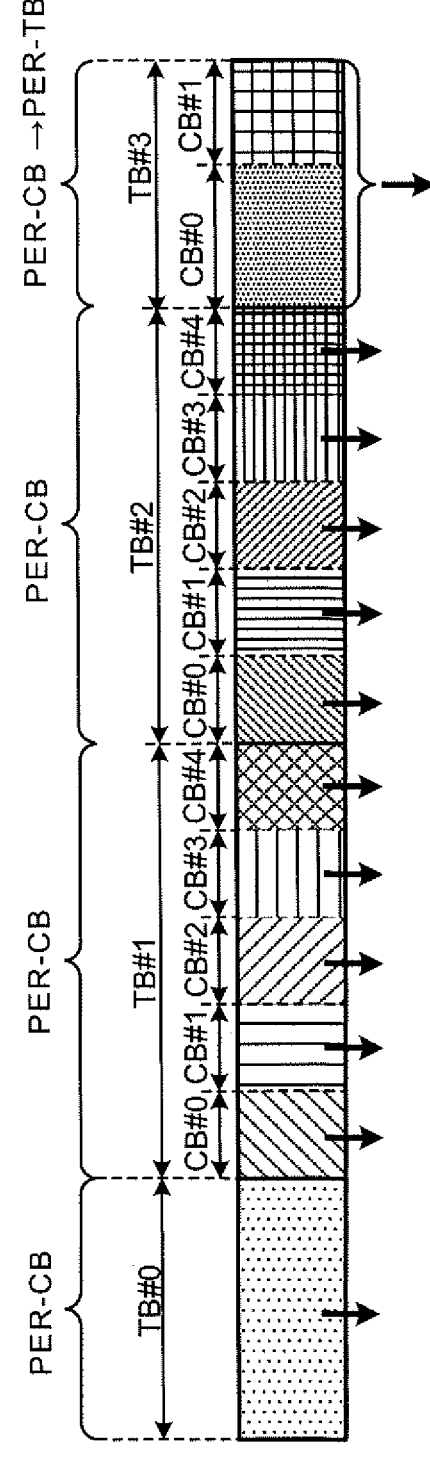

FIG. 6 contains diagrams showing another example of dynamic control of transmission unit of A/N according to Aspect 2. FIG. 6A illustrates the case where the transmission unit of A/N is changed to per-TB starting with the TB of large TBS. FIG. 6B illustrates the case where the transmission unit is changed to per-TB starting with the TB of small TBS.

For example, in FIG. 6A, since the TBS of each of TBs#1 and #2 is larger than the TBS of TB#3, the user terminal changes A/N bits of 5 bits per-CB of each of TBs#1 and #2 to an A/N bit of 1 bit per-TB. By this means, it is possible to reduce A/N bits of 13 bits per-CB to A/N bits of 5 bits. As shown in FIG. 6A, in the case of changing the transmission unit to per-TB starting with the TB of large TBS, it is possible to significantly obtain the effect of reducing A/N bits.

On the other hand, in FIG. 6B, since the TBS of TB#3 is smaller than the TBS of each of TBs#1 and #2, the user terminal changes A/N bits of 2 bits per-CB of TB#3 to an A/N bit of 1 bit per-TB. By this means, it is possible to reduce A/N bits of 13 bits per-CB to A/N bits of 12 bits. In FIG. 6B, as compared with FIG. 6A, since it is possible to transmit A/N bits as feedback in high resolution, it is possible to prevent performance of DL from decreasing.

In Aspect 2, even in the case where transmission of A/N for each CB is configured for a user terminal, based on the DCI or payload of the UL signal, the user terminal is capable of changing the transmission unit of A/N to for each TB, and controlling transmission of A/N for each TB. Accordingly, it is possible to reduce limitations on the configuration of transmission of A/N for each CB.

(Aspect 3)

Aspect 3 describes transmission control of A/N for each CB in detail. As described above, the number of CBs per TB may be determined based on the TBS. Since the TBS is dynamically controlled based on an MCS index included in DCI and the number of PBRs allocated to a DL signal, the number of CBs per TB determined based on the TBS is also controlled dynamically. It is expected that the number of CBs per TB increases, as the TBS increases. For example, it is expected that a single TB is segmented into ten or more CBs.

In the case of transmitting A/N for each CB, when a user terminal misses a detection of DCI, or erroneously detects DCI, there is the risk that the user terminal does not grasp the number of scheduled CBs. In this case, the case occurs where the radio base station differs from the user terminal in recognition of the number of A/N bits (codebook size of HARQ-ACK) transmitted from the user terminal as feedback. In this case, there is the risk that the radio base station is not capable of properly decoding the A/N bit transmitted from the user terminal as feedback.

Figures 7A, 7B:
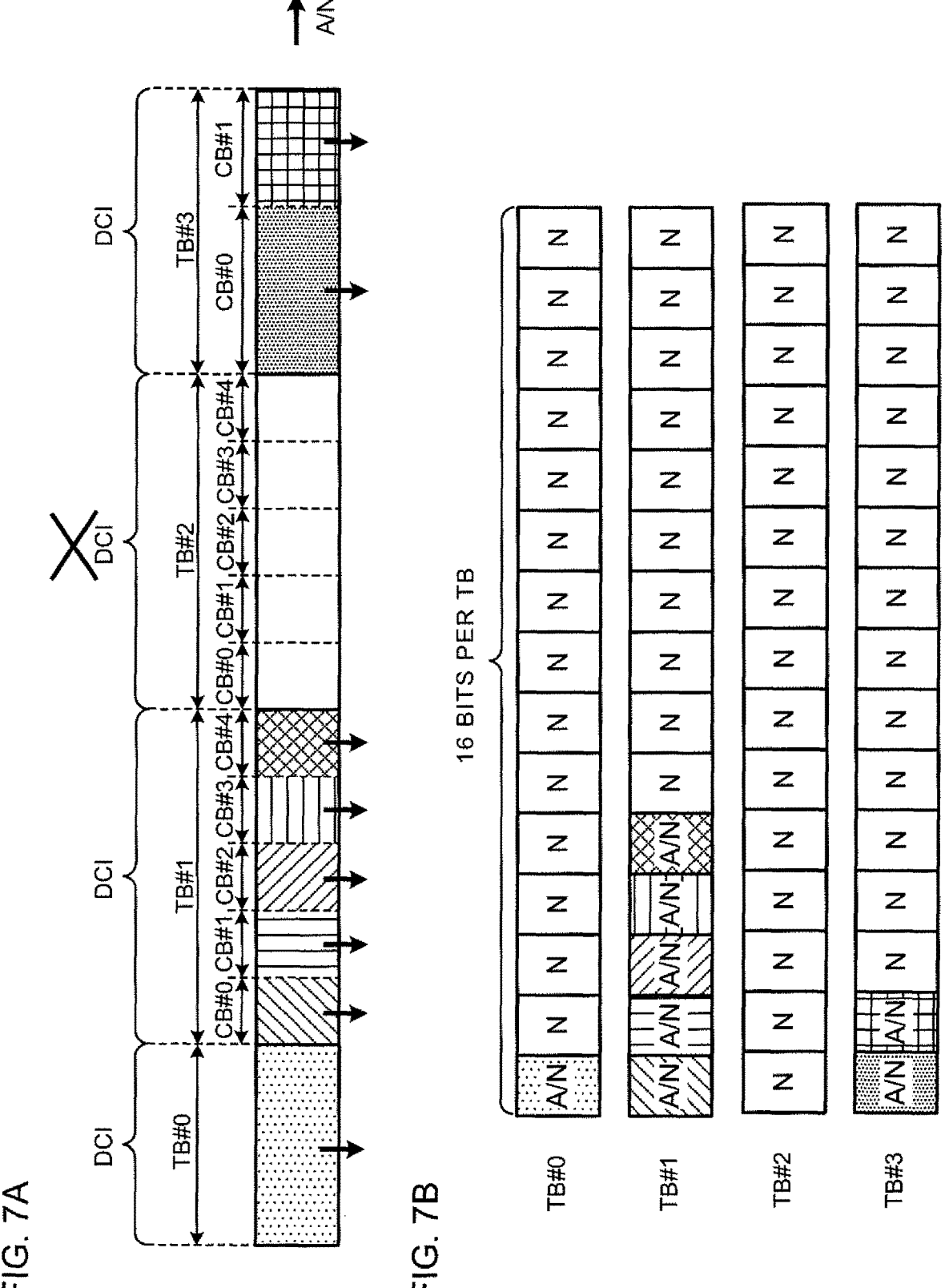
FIGS. 7A and 7B are diagrams showing one example of transmission control of A/N for each CB according to Aspect 3.

FIG. 7 contains diagrams showing one example of transmission control of A/N for each CB according to Aspect 3. In FIG. 7A, the radio base station expects receiving A/N bits of total 13 bits including 1 bit corresponding to 1 CB of TB#0, 10 (5×2) bits corresponding to 5 CBs of each of TBs#1 and #2, and 2 bits corresponding to 2 CBs of TB#3. On the other hand, in the case where the user terminal misses a detection of DCI for scheduling TB#2, the user terminal transmits A/N bits of 8 bits corresponding to 8 CBs constituting TBs#0, #1 and #3 except TB#2.

In FIG. 7A, the radio base station does not recognize that the user terminal misses a detection of the DCI for scheduling TB#2. Therefore, in FIG. 7A, the number of A/N bits expected by the radio base station does not match with the number of A/N bits transmitted from the user terminal as feedback, and there is the risk that the radio base station is not capable of properly decoding the A/N bit transmitted from the user terminal as feedback.

Therefore, in Aspect 3, by semi-statically or dynamically controlling the number of A/N bits transmitted from a user terminal as feedback, even when the user terminal misses a detection of DCI or erroneously detects DCI, the mismatch is avoided between the number of A/N bits expected by the radio base station and the number of A/N bits transmitted from the user terminal as feedback.

<Semi-Static Control>

In semi-static control, based on information (number-of-CB information) on the number of CBs per TB configured by higher layer signaling, a user terminal controls transmission of A/N for each CB. Irrespective of the number of CBs included in the TB, the user terminal transmits A/N bits of the number of bits indicated by the number-of-CB information as feedback. Such semi-static control of the number of A/N bits is also called semi-static HARQ-ACK codebook adaptation and the like.

The number-of-CB information undergoing higher layer signaling may be determined based on the maximum number of CBs per TB. For example, in the case where the maximum number of CBs per TB is "16", the higher layer signaling may indicate that A/N bits of 16 bits per TB are transmitted as feedback.

In FIG. 7A, when it is assumed that the higher layer signaling indicates that the number of A/N bits per TB is "16", as shown in FIG. 7B, irrespective of the number of CBs included in TBs#0 to #3, the user terminal generates A/N bits of total 64 bits including 16 bits for each of TBs#0 to #3.

As shown in FIG. 7B, in TB#0, based on an error detection result of one CB, the terminal generates 1 bit indicative of ACK or NACK, and 15 bits indicative of NACK. In TB#1, based on an error detection result of each of CBs#0 to #4, the terminal generates 5 bits each indicative of ACK or NACK, and 11 bits each indicative of NACK.

In FIG. 7A, TB#2 is not detected by detection missing of the DCI for scheduling TB#2, and therefore, as shown in FIG. 7B, in TB#2, the terminal generates 16 bits each indicative of NACK. In TB#3, based on an error detection result of each of CBs#0 and #2, the terminal generates 2 bits each indicative of ACK or NACK, and 14 bits each indicative of NACK.

Thus, in the case of transmitting A/N bits of the number of bits configured by higher layer signaling as feedback, irrespective of the number of CBs included in each TB, even when the user terminal misses a detection of DCI or erroneously detects DCI, it is possible to avoid the mismatch between the number of A/N bits expected by the radio base station and the number of A/N bits transmitted from the user terminal as feedback.

<Dynamic Control>

In dynamic control, based on the number-of-CB information on the number of CBs per TB indicated by DCI, a user terminal transmits A/N bits of the number of bits equal to the number of CBs per TB as feedback. Such dynamic control of the number of A/N bits is also called dynamic HARQ-ACK codebook adaptation and the like. The number of A/N bits dynamically controlled may be indicated to the user terminal from the base station, or may be notified from the user terminal to the base station.

«Instructions from the Radio Base Station»

The number-of-CB information included in DCI may be a cumulative value of CBs included in one or more TBs. The radio base station may include the number-of-CB information indicative of a cumulative value of CBs in one or more pieces of DCI for scheduling the one or more TBs.

As the number-of-CB information, for example, DAI (Downlink Assignment Indicator (Index)) may be used, where the DAI indicates a cumulative value of CBs in a plurality of subframes (also referred to as a plurality of slots, bundling window, etc.) The DAI is included in each DCI for scheduling one or more TBs in each subframe (slot) inside a bundling window, and indicates a cumulative value of CBs inside the bundling window.

Figures 8A, 8B:
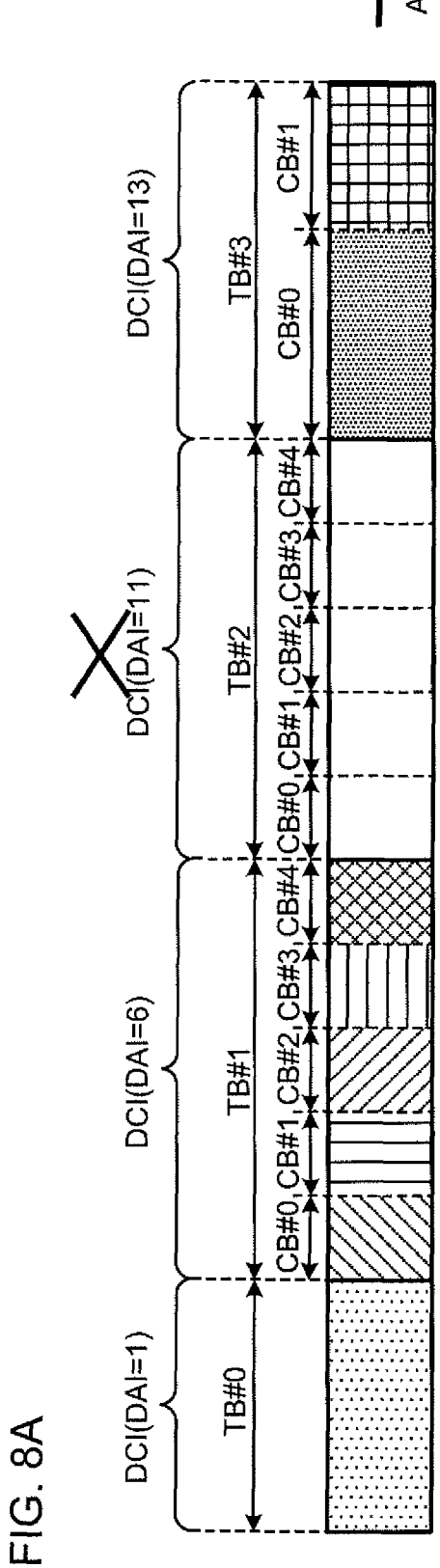
FIGS. 8A and B are diagrams showing another example of transmission control of A/N for each CB according to Aspect 3.

FIG. 8 contains diagrams showing another example of transmission control of A/N for each CB according to Aspect 3. In addition, in FIG. 8A, it is assumed that TBs#0 to #3 are included in a bundling window, and are scheduled respectively by four different pieces of DCI.

As shown in FIG. 8A, DCI for scheduling TB#0 includes DAI=1 indicating that a cumulative value of CBs is "1". Further, since TB#1 is comprised of five CBs#0 to #4, DCI for scheduling TB#1 includes DAI=6 indicating that a cumulative value of CBs is "6 (=1+5)". Similarly, DCI for scheduling TB#2 includes DAI value=11 indicating that a cumulative value of CBs is "11 (=1+5+5)". Further, DCI for scheduling TB#3 includes DAI value=13 indicating that a cumulative value of CBs is "13 (=1+5+5+2)".

As shown in FIG. 8B, based on the DAI in the DCI for scheduling TB#0, the user terminal generates an A/N bit of 1 bit based on an error detection result of one CB. Further, based on the DAI in the DCI for scheduling TB#1, the user terminal generates A/N bits of 5 bits based on an error detection result of each of CBs#0 to #4.

In FIG. 8A, although the DAI is "6" in the DCI for scheduling TB#1, since the DAI is "13" in the DCI for scheduling TB#3 and TB#3 includes only two CBs#0 and #1, the user terminal is capable of recognizing detection missing of TB#2 including 5 CBs. Therefore, as shown in FIG. 8B, the user terminal generates NACK of 5 bits of CBs#0 to #4 of TB#2, and A/N bits of 2 bits based on an error detection result of each of CBs#0 and #1 of TB#3.

Thus, the DAI indicative of a cumulative value of CBs is included in each DCI inside a bundling window, and the user terminal is thereby capable of recognizing the number of CBs inside the TB scheduled by the DCI which is missed in detection or is erroneously detected. Therefore, even in the case of transmitting the number of A/N bits equal to the number of CBs per TB as feedback, it is possible to avoid the mismatch between the number of A/N bits expected by the radio base station and the number of A/N bits transmitted from the user terminal as feedback.

«Notification from the User Terminal»

Alternatively, the user terminal may transmit information (A/N identification information) indicative of the CB and/or TB (CB/TB) to which the A/N bit corresponds to the radio base station, together with the A/N bit for each CB. The A/N identification information may be coded independently of the A/N bit (HARQ-ACK codebook) for each CB.

Figures 9A, 9B:
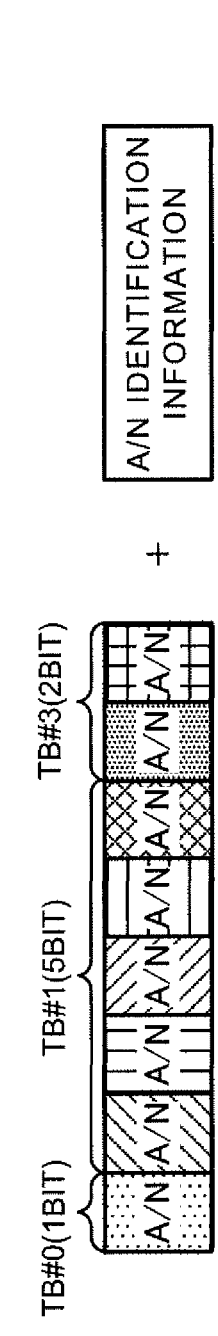
FIGS. 9A and 9B are diagrams showing still another example of transmission control of A/N for each CB according to Aspect 3.

FIG. 9 contains diagrams showing still another example of transmission control of A/N for each CB according to Aspect 3. In addition, in the case shown in FIG. 9A, as shown in FIG. 9B, the user terminal may transmit, to the radio base station, the A/N identification information indicative of A/N bits of total 8 CBs comprised of 1 CB of TB#0, CBs#0 to #4 of TB#1, and CBs#0 and #1 of TB#3, and A/N bits of 8 bits.

Thus, the user terminal transmits the A/N identification information together with the A/N bits, and the radio base station is thereby capable of recognizing which CB/TB is of the A/N bit. Therefore, even when the user terminal misses a detection of DCI, or erroneously detects DCI, it is possible to prevent the mismatch from occurring between the number of A/N bits expected by the radio base station and the number of A/N bits transmitted from the user terminal as feedback.

(Aspect 4)

As described in Aspect 3, in the case of transmitting A/N for each CB as feedback, it is desirable that a CB (erroneous CB) retransmission of which is required by NACK is retransmitted for each CB. Therefore, Aspect 4 describes a configuration of a TB including a retransmitted CB (retransmission CB). In Aspect 4, the radio base station may schedule the TB including only one or more retransmission CBs (first configuration), or may schedule a TB including both of one or more retransmission CBs and newly transmitted CB (new CB) (second configuration).

<First Configuration>

In the first configuration, only one or more retransmission CBs may be scheduled by single DCI. In other words, in the first configuration, it is not expected that the retransmission CB and new CB are multiplexed.

In the first configuration, DCI may include information (e.g., NDI) indicating whether or not the scheduled DL data is new transmission (or whether or not the data is retransmission.) In the case of indicating retransmission (e.g., NDI is not toggled), the DCI may include information (retransmission CB identification information, e.g., identification of HPN and/or CB) indicating which erroneous CB is retransmitted.

Figure 10:
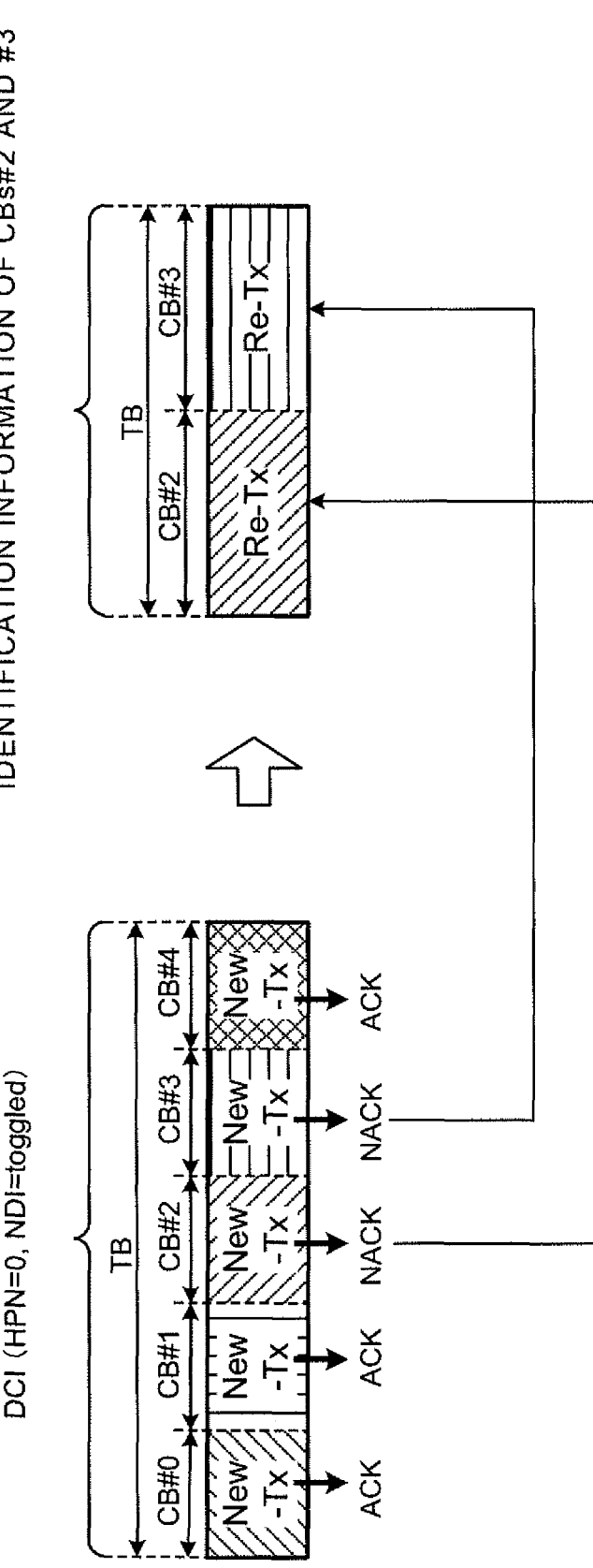
FIG. 10 is a diagram showing a first configuration example of TB according to Aspect 4.

FIG. 10 is a diagram showing a first configuration example of TB according to Aspect 4. In FIG. 10, it is assumed that a TB including CBs#0 to #4 is newly transmitted, and that another TB including CBs#2 and #3 is retransmitted based on NACK of CBs#2 and #3 transmitted from the user terminal as feedback.

For example, in FIG. 10, DCI for scheduling newly transmitted CBs#0 to #4 includes HPN value "0" and information (e.g., toggled NDI) indicative of new transmission. On the other hand, DCI for scheduling retransmitted CBs#2 and #3 includes the same HPN value "0" as in new transmission, information (e.g., non-toggled NDI) indicative of retransmission, and identification information of CBs#2 and #3.

Based on the NDI (e.g., non-toggled NDI) included in the DCI, the user terminal recognizes that the retransmission CB is scheduled by the DCI. Further, based on the HPN and/or identification information of the CB included in the DCI, the user terminal recognizes which erroneous CB is retransmitted (in FIG. 10, CBs#2 and #3 of HPN=0 are retransmitted.)

As shown in FIG. 10, the size of the TB comprised of only retransmission CBs is the size of the TB comprised of only new CBs or less. Therefore, a transmission scheme different from that of the TB comprised of newly transmitted CBs may be used in the TB comprised of retransmission CBs. For example, at least one of the number of PRBs smaller than in the TB comprised of newly transmitted CBs, small MCS index, the number of layers of low MIMO (Multiple-Input and Multiple-Output), and short TTI length may be used in the TB comprised of retransmission CBs.

As shown in FIG. 10, in the case where the retransmission CB and new CB are not multiplexed, based on the information (e.g., NDI) indicating whether or not transmission is new transmission in DCI, the user terminal is capable of easily determining whether the TB is the TB including new CBs, or the TB including retransmission CBs.

<Second Configuration>

In the second configuration, one or more retransmission CBs and one or more new TBs may be scheduled by single DCI. In other words, in the second configuration, the retransmission CB and new CB are multiplexed.

In the second configuration, DCI may include the abovementioned information (e.g., NDI) indicating whether or not transmission is new transmission. Further, in the case where new transmission is indicated (e.g., NDI is toggled), the DCI may include information (retransmission CB multiplexing information) indicating whether or not the retransmission CB and new CB are multiplexed (whether or not the TB includes the retransmission CB). Further, the DCI may include retransmission CB identification information indicating which erroneous CB is retransmitted. The number of CBs in the TB may be determined based on the TBS indicated by the DCI.

Figure 11:
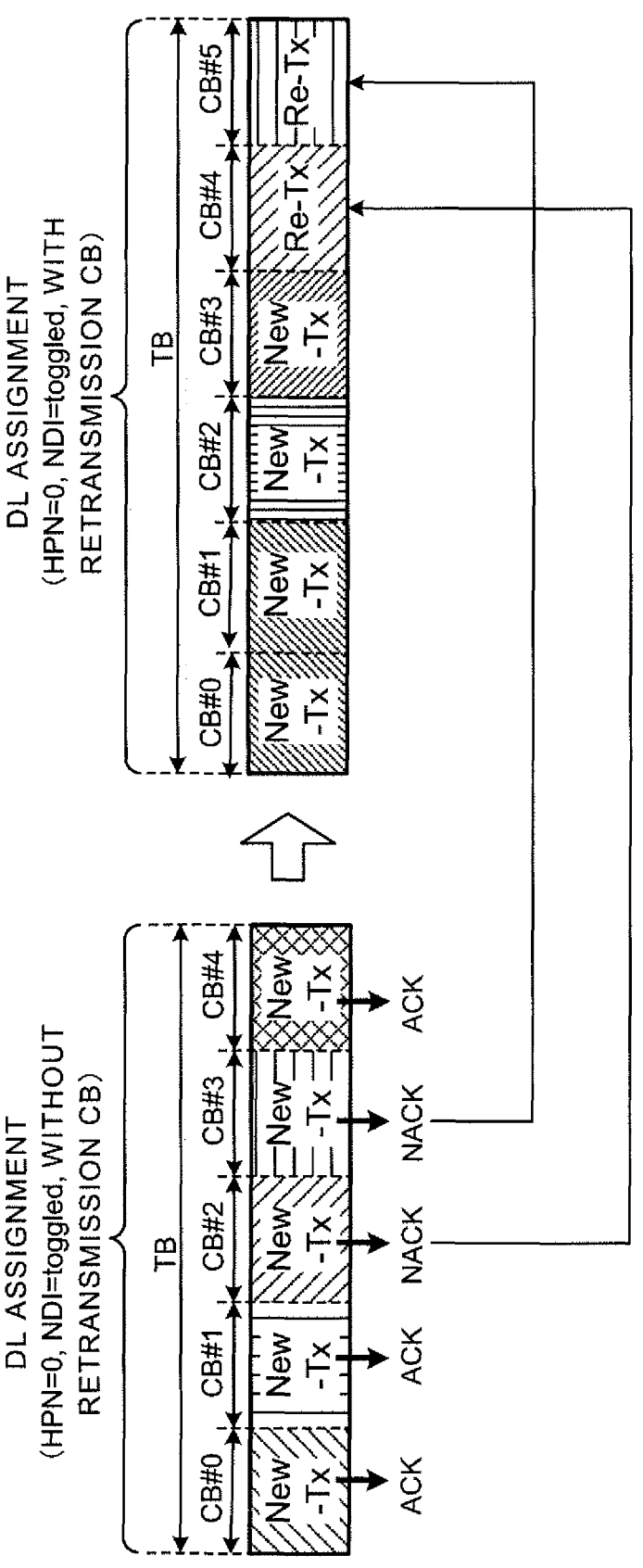
FIG. 11 is a diagram showing a second configuration example of TB according to Aspect 4.

FIG. 11 is a diagram showing a second configuration example of TB according to Aspect 4. In FIG. 11, it is assumed that a TB including CBs#0 to #4 is newly transmitted, and that another TB including new CBs#0 to #3 and retransmission CBs#4 and #5 is transmitted based on NACK of CBs#2 and #3 transmitted from the user terminal as feedback.

For example, in FIG. 11, DCI for scheduling new CBs#0 to #4 includes HPN value "0", information (e.g., toggled NDI) indicative of new transmission, and retransmission CB multiplexing information indicating that the retransmission CB is not multiplexed. On the other hand, DCI for scheduling new CBs#0 to #3 and retransmission CBs#4 and #5 includes the same HPN value "0" as in new transmission, information (e.g., toggled NDI) indicative of new transmission, and retransmission CB multiplexing information indicating that retransmission CBs are multiplexed.

Based on the retransmission CB multiplexing information, the user terminal recognizes that the retransmission CB is scheduled by the DCI. Further, based on the HPN and/or identification information of the CB included in the DCI, the user terminal may recognize which erroneous CB is retransmitted (in FIG. 11, CBs#2 and #3 of HPN=Q are retransmitted.)

In the case where the retransmission CB and new CB are multiplexed, as shown in FIG. 11, the retransmission CB may be coupled subsequent to the new CB. Alternatively, although not shown in the figure, the new CB may be coupled subsequent to the retransmission CB.

As shown in FIG. 11, in the case where the retransmission CB and new CB are multiplexed, it is possible to transmit more information in a single TB, and it is thereby possible to improve throughput.

(Other Aspects)

In the aforementioned Aspects 1 to 4, per-CB is described as retransmission control in a unit smaller than per-TB, and retransmission control may be performed in per-code block group (CBG) obtained by grouping a plurality of CBs. For example, the user terminal may generate an A/N bit every CBG (e.g., 2 CBs, 4 CBs or 8 CBs) to transmit to the radio base station as feedback. Further, the number of CBs constituting the CBG may be configured for the user terminal by higher layer signaling.

Further, also in the case of configuring A/N feedback per-CB, when DCI is detected in common search space, the user terminal may report A/N per-TB. In other words, as a fallback mode of A/N feedback per-CB, A/N feedback per-TB may be used.

Furthermore, the aforementioned Aspects 1 to 4 describe A/N feedback of the DL signal, and the Aspects 1 to 4 are also applicable to the case of performing feedback of A/N of the UL signal per-CB.

(Radio Communication System)

A configuration of a radio communication system according to this Embodiment will be described below. In the radio communication system, the radio communication method according to each of the above-mentioned Aspects is applied. In addition, the radio communication method according to each of the above-mentioned Aspects may be applied alone, or may be applied in combination.

Figure 12:
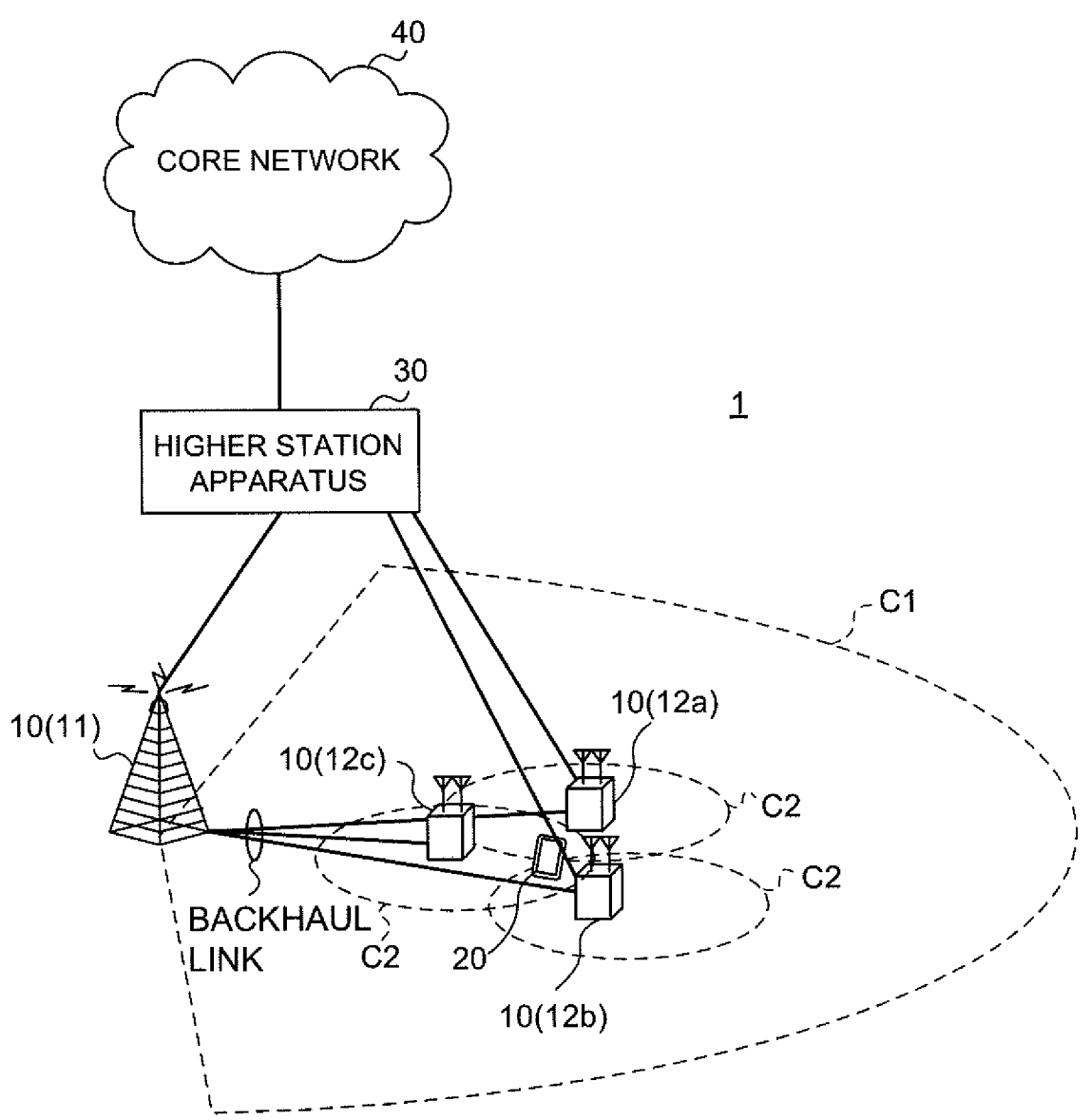
FIG. 12 is a diagram showing one example of a schematic configuration of a radio communication system according to this Embodiment.

FIG. 12 is a diagram showing one example of a schematic configuration of the radio communication system according to this Embodiment. In the radio communication system 1, it is possible to apply carrier aggregation (CA) to aggregate a plurality of base frequency blocks (component carriers) with a system bandwidth (e.g., 20 MHz) of the LTE system as one unit and/or dual connectivity (DC). In addition, the radio communication system 1 may be called SUPER 3G, LTE-A (LTE-Advanced), IMT-Advanced, 4G, 5G, FRA (Future Radio Access), NR (New-Rat) and the like.

The radio communication system 1 as shown in FIG. 12 is provided with a radio base station 11 for forming a macrocell C1, and radio base stations 12a to 12c disposed inside the macrocell C1 to form small cells C2 narrower than the macrocell C1. Further, a user terminal 20 is disposed in the macrocell C1 and each of the small cells C2. It may be configured to apply different numerology between cells. In addition, the numerology refers to design of signal in some RAT, and a set of communication parameters characterizing design of RAT.

The user terminal 20 is capable of connecting to both the radio base station 11 and the radio base station 12. The user terminal 20 is assumed to concurrently use the macrocell C1 and small cell C2 using different frequencies, by CA or DC. Further, the user terminal 20 may apply CA or DC using a plurality of cells (CCs) (e.g., 2 or more CCs). Furthermore, the user terminal is capable of using a licensed band CC and an unlicensed band CC as a plurality of CCs.

Moreover, the user terminal 20 is capable of performing communication in each cell, using Time Division Duplex (TDD) or Frequency Division Duplex (FDD). A cell of TDD and a cell of FDD may be called TDD carrier (Frame configuration type 2), FDD carrier (Frame configuration type 1), or the like, respectively.

Further, each cell (carrier) may apply one of a subframe (also referred to as TTI, ordinary TTI, long TTI, ordinary subframe, long subframe, slot and the like) having a relatively long time length (e.g., 1 ms), and a subframe (also referred to as short TTI, short subframe, slot and the like) having a relatively short time length, or may apply both the long subframe and the short subframe. Furthermore, each cell may apply subframes having two or more time lengths.

The user terminal 20 and radio base station 11 are capable of communicating with each other using carriers (called the existing carrier, Legacy carrier and the like) with a narrow bandwidth in a relatively low frequency band (e.g., 2 GHz). On the other hand, the user terminal 20 and radio base station 12 may use carriers with a wide bandwidth in a relatively high frequency band (e.g., 3.5 GHz, 5 GHz, 30 GHz to 70 GHs, etc.), or may use the same carrier as in the radio base station 11. In addition, the configuration of the frequency band used in each radio base station is not limited thereto.

It is possible to configure so that the radio base station 11 and radio base station 12 (or, two radio base stations 12) undergo wired connection (e.g., optical fiber in conformity with CPRI (Common Public Radio Interface), X2 interface, etc.), or wireless connection.

The radio base station 11 and each of the radio base stations 12 are respectively connected to a higher station apparatus 30, and are connected to a core network 40 via the higher station apparatus 30. In addition, for example, the higher station apparatus 30 includes an access gateway apparatus, Radio Network Controller (RNC), Mobility Management Entity (MME) and the like, but is not limited thereto. Further, each of the radio base stations 12 may be connected to the higher station apparatus 30 via the radio base station 11.

In addition, the radio base station 11 is a radio base station having relatively wide coverage, and may be called a macro base station, collection node, eNB (eNodeB), transmission and reception point and the like. Further, the radio base station 12 is a radio base station having local coverage, and may be called a small base station, micro-base station, pico-base station, femto-base station, HeNB (Home eNodeB), RRH (Remote Radio Head), transmission and reception point and the like. Hereinafter, in the case of not distinguishing between the radio base stations 11 and 12, the stations are collectively called a radio base station 10.

Each user terminal 20 is a terminal supporting various communication schemes such as LTE and LTE-A, and may include a fixed communication terminal, as well as the mobile communication terminal. Further, the user terminal 20 is capable of performing Device-to-Device (D2D) communication with another user terminal 20

In the radio communication system 1, as radio access schemes, OFDMA (Orthogonal Frequency Division Multiple Access) is applied on downlink (DL), and SC-FDMA (Single Carrier-Frequency Division Multiple Access) is applied on uplink (UL). OFDMA is a multicarrier transmission scheme for dividing a frequency band into a plurality of narrow frequency bands (subcarriers), and mapping data to each subcarrier to perform communication. SC-FDMA is a single-carrier transmission scheme for dividing a system bandwidth into bands comprised of one or contiguous resource blocks for each terminal so that a plurality of terminals uses mutually different bands, and thereby reducing interference among terminals. In addition, uplink and downlink radio access schemes are not limited to the combination of the schemes, and OFDMA may be used on UL. Further, SC-FDMA is applicable to side link (SL) used in device-to-device communication.

As DL channels, in the radio communication system 1 are used a DL data channel (PDSCH: Physical Downlink Shared Channel, also referred to as DL shared channel, etc.) shared by user terminals 20, broadcast channel (PBCH: Physical Broadcast Channel), L1/L2 control channels and the like. User data, higher layer control information, SIB (System Information Block) and the like are transmitted on the PDSCH. Further, MIB (Master Information Block) is transmitted on the PBCH.

The L1/L2 control channel includes DL control channels) (PDCCH (Physical Downlink Control Channel), EPDCCH (Enhanced Physical Downlink Control channel)), PCFICH (Physical Control Format Indicator Channel), PHICH (Physical Hybrid-ARQ Indicator Channel) and the like. The downlink control information (DCI) including scheduling information of the PDSCH and PUSCH and the like is transmitted on the PDCCH. The number of OFDM symbols used in the PDCCH is transmitted on the PCFICH. The EPDCCH is frequency division multiplexed with the PDSCH to be used in transmitting the DCI and the like as the PDCCH. It is possible to transmit receipt confirmation information (A/N, HARQ-ACK) of the PUSCH, using at least one of the PHICH, PDCCH and EPDCCH.

As UL channels, in the radio communication system 1 are used a UL data channel (PUSCH: Physical Uplink Shared Channel, also referred to as UL shared channel) shared by user terminals 20, UL control channel (PUCCH: Physical Uplink Control Channel), random access channel (PRACH: Physical Random Access Channel) and the like. User data and higher layer control information is transmitted on the PUSCH. Uplink control information (UCI) including at least one of receipt confirmation information (A/N, HARQ-ACK) of the PDSCH, channel state information (CSI) and the like is transmitted on the PUSCH or PUCCH. It is possible to transmit a random access preamble to establish connection with the cell on the PRACH.

<Radio Base Station>

Figure 13:
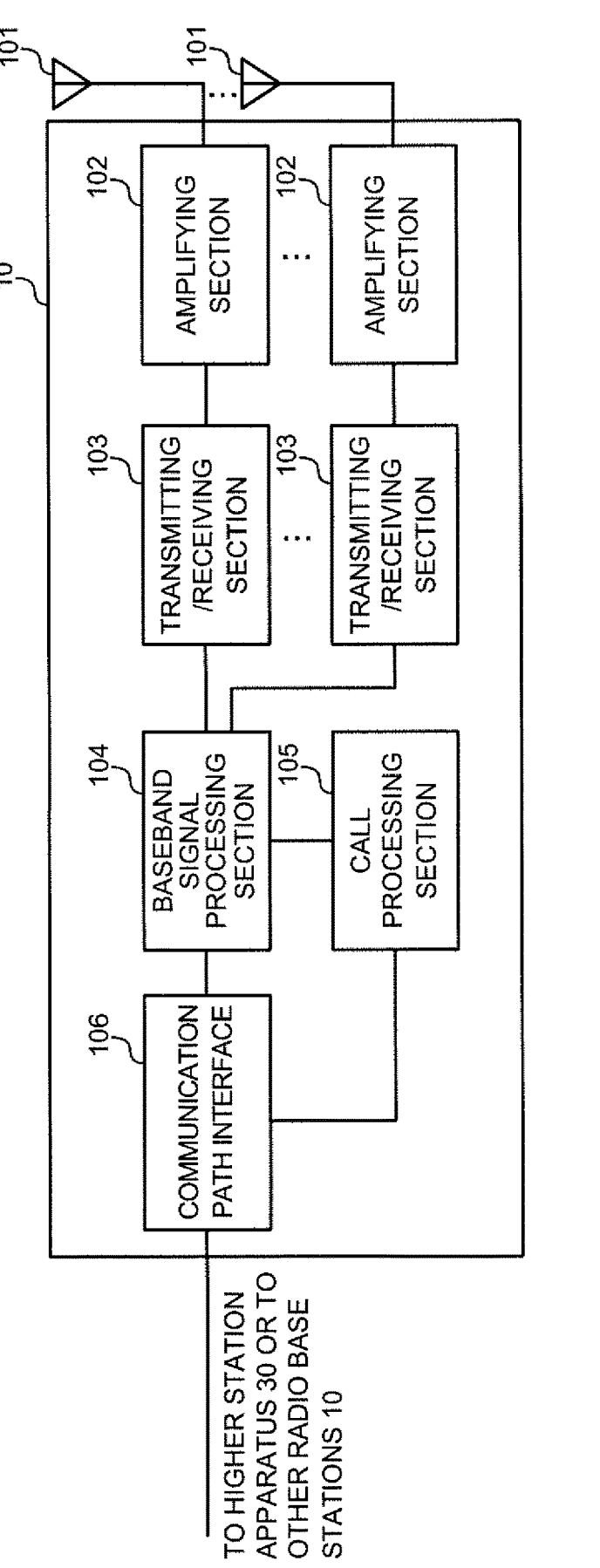
FIG. 13 is a diagram showing one example of an entire configuration of a radio base station according to this Embodiment.

FIG. 13 is a diagram showing one example of an entire configuration of the radio base station according to this Embodiment. The radio base station 10 is provided with a plurality of transmitting/receiving antennas 101, amplifying sections 102, transmitting/receiving sections 103, baseband signal processing section 104, call processing section 105, and communication path interface 106. In addition, with respect to each of the transmitting/receiving antenna 101, amplifying section 102, and transmitting/receiving section 103, the radio base station may be configured to include at least one or more.

User data to transmit to the user terminal 20 from the radio base station 10 on downlink is input to the baseband signal processing section 104 from the higher station apparatus 30 via the communication path interface 106.

The baseband signal processing section 104 performs, on the user data, transmission processing such as processing of PDCP (Packet Data Convergence Protocol) layer, segmentation and concatenation of the user data, transmission processing of RLC (Radio Link Control) layer such as RLC retransmission control, MAC (Medium Access Control) retransmission control (e.g., processing of HARQ (Hybrid Automatic Request reQuest)), scheduling, transmission format selection, channel coding, rate matching, scrambling, Inverse Fast Fourier Transform (IFFT) processing, and precoding processing to transfer to the transmitting/receiving sections 103. Further, also concerning a downlink control signal, the section 104 performs transmission processing such as channel coding and Inverse Fast Fourier Transform on the signal to transfer to the transmitting/receiving sections 103.

Each of the transmitting/receiving sections 103 converts the baseband signal, which is subjected to precoding for each antenna and is output from the baseband signal processing section 104, into a signal with a radio frequency band to transmit. The radio-frequency signal subjected to frequency conversion in the transmitting/receiving section 103 is amplified in the amplifying section 102, and is transmitted from the transmitting/receiving antenna 101.

The transmitting/receiving section 103 is capable of being comprised of a transmitter/receiver, transmitting/receiving circuit or transmitting/receiving apparatus explained based on common recognition in the technical field according to the present invention. In addition, the transmitting/receiving section 103 may be comprised as an integrated transmitting/receiving section, or may be comprised of a transmitting section and receiving section.

On the other hand, for UL signals, radio-frequency signals received in the transmitting/receiving antennas 101 are amplified in the amplifying sections 102. The transmitting/receiving section 103 receives the UL signal amplified in the amplifying section 102. The transmitting/receiving section 103 performs frequency conversion on the received signal into a baseband signal to output to the baseband signal processing section 104.

For UL data included in the input UL signal, the baseband signal processing section 104 performs Fast Fourier Transform (FFT) processing, Inverse Discrete Fourier Transform (IDFT) processing, error correcting decoding, reception processing of MAC retransmission control, and reception processing of RLC layer and PDCP layer to transfer to the higher station apparatus 30 via the communication path interface 106. The call processing section 105 performs call processing such as configuration and release of a communication channel, state management of the radio base station 10, and management of radio resources.

The communication path interface 106 transmits and receives signals to/from the higher station apparatus 30 via a predetermined interface. Further, the communication path interface 106 may transmit and receive signals (backhaul signaling) to/from another adjacent radio base station 10 via an inter-base station interface (e.g., optical fiber in conformity with CPRI (Common Public Radio Interface), X2 interface).

In addition, the transmitting/receiving section 103 transmits a DL signal (e.g., at least one of DCI (DL assignment and/or UL grant), DL data, and DL reference signal,) and receives a UL signal (e.g., at least one of UL data, UCI and UL reference signal).

Further, the transmitting/receiving section 103 receives the receipt confirmation information (also referred to as A/N, HARQ-ACK, etc.) of a DL signal, and transmits A/N of a UL signal. A transmission unit of the A/N may be any of a CB-by-CB basis, CBG-by-CBG basis, TB-by-TB basis, and a basis of a plurality of TBs subjected to bundling. For example, the transmitting/receiving section 103 may transmit at least one of the transmission unit information used in configuring one of a plurality of transmission units such as a CB-by-CB basis, CBG-by-CBG basis, TB-by-TB basis, and a basis of a plurality of TBs, the dynamic control information used in dynamic control of the transmission unit of A/N, and the number-of-CB information (number-of-CBG information) on the number of CBs (or the number of CBGs) per TB.

Figure 14:
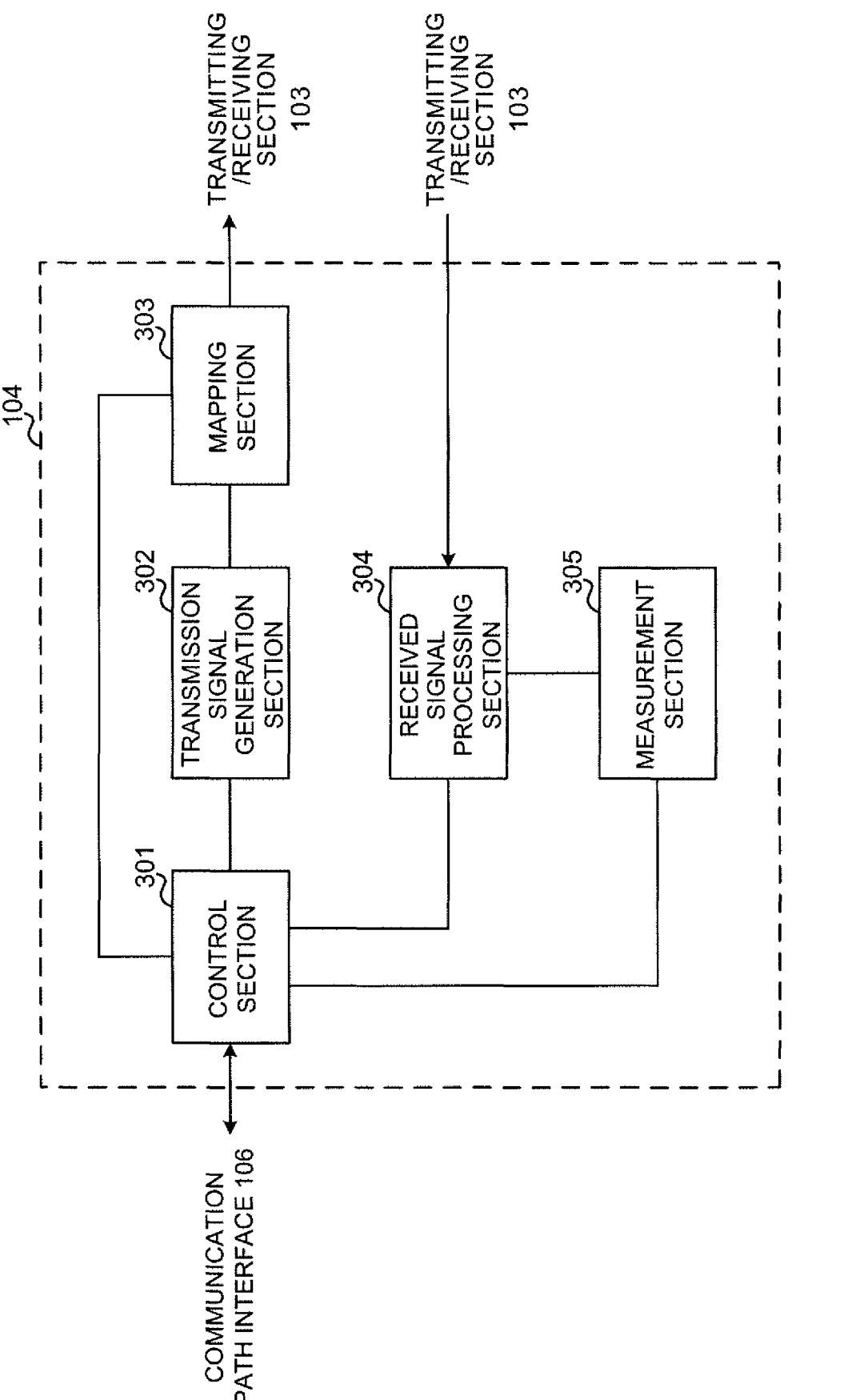
FIG. 14 is a diagram showing one example of a function configuration of the radio base station according to this Embodiment.

FIG. 14 is a diagram showing one example of a function configuration of the radio base station according to this Embodiment. In addition, FIG. 14 mainly illustrates function blocks of a characteristic portion in this Embodiment, and the radio base station 10 is assumed to have other function blocks required for radio communication. As shown in FIG. 14, the baseband signal processing section 104 is provided with a control section 301, transmission signal generating section 302, mapping section 303, received signal processing section 304, and measurement section 305.

The control section 301 performs control of the entire radio base station 10. For example, the control section 301 controls scheduling of DL signals and UL signals, generation processing (e.g., coding, modulation, etc.) of DL signals by the transmission signal generating section 302, mapping of DL signals by the mapping section 303, reception processing (e.g., demodulation, decoding, etc.) of UL signals by the received signal processing section 304, and measurement by the measurement section 305.

Specifically, based on a channel quality indicator (CQI) transmitted from the user terminal 20 as feedback, the control section 301 determines a modulation scheme and TBS of a DL signal. The control section 301 controls the transmission signal generating section 302 so as to encode the DL signal with the TBS and modulate the DL signal with the modulation scheme.

Further, in the case where the TBS exceeds a predetermined threshold, the control section 301 may apply code block segmentation for segmenting the TBS into a plurality of CBs to the DL signal. Specifically, the control section 301 may control the transmission signal generating section 302 so as to perform coding and rate matching for each CB, and may control the mapping section 303 so as to map a CW obtained by coupling CBs. Furthermore, in the case where the TBS exceeds a predetermined threshold, the control section 301 may apply code block segmentation to the UL signal.

Furthermore, the control section 301 controls reception processing (e.g., demodulation, decoding, etc.) of UL signals. For example, the control section 301 may control the received signal processing section 304 so as to demodulate a UL signal based on a modulation scheme indicated by an MCS index designated in DCI (UL grant), determine a TBS based on a TBS index indicated by the MCS index and the number of allocated resource blocks, and decode the DL signal based on the TBS.

Still furthermore, the control section 301 controls reception processing (e.g., demodulation, decoding, etc.) of UL signals. For example, the control section 301 may control the received signal processing section 304 so as to demodulate a UL signal based on a modulation scheme indicated by an MCS index designated in DCI (UL grant), determine a TBS based on a TBS index indicated by the MCS index and the number of allocated resource blocks, and decode the DL signal based on the TBS.

Moreover, the control section 301 may control a transmission unit of A/N of a DL signal and/or a UL signal. For example, the control section 301 may control the transmission signal generating section 302 and mapping section 303 so as to transmit the transmission unit information for configuring one of a plurality of transmission units (e.g., one of a plurality of transmission units such as CB, CBG, TB, and a plurality of TBs subjected to bundling) by higher layer signaling (Aspect 1).

Further, the control section 301 may control the transmission signal generating section 302 and mapping section 303 so as to generate the dynamic control information for dynamically controlling the transmission unit configured by higher layer signaling, and transmit DCI including the dynamic control information (Aspect 2).

Furthermore, in the case where the transmission unit of A/N of the DL signal and/or the UL signal is CB or CBG, the control section 301 may control the transmission signal generating section 302 and mapping section 303 so as to transmit the number-of-CB information (number-of-CBG information) on the number of CBs (or the number of CBGs) per TB (Aspect 3).

Still furthermore, based on A/N for each CB (or for each CBG) from the user terminal 20, the control section 301 may control retransmission of each CB (or each CBG) constituting the DL signal (Aspect 4). Further, the control section 301 may control the transmission signal generating section 302 and mapping section 303 so as to transmit a retransmission CB (or retransmission CBG) without multiplexing with a new CB (or retransmission CBG) (FIG. 10). The control section 301 may control the transmission signal generating section 302 and mapping section 303 so as to multiplex a retransmission CB (or retransmission CBG) with a new CB (or retransmission CBG) to transmit (FIG. 11).

Moreover, the control section 301 may control the transmission signal generating section 302 and mapping section 303 so as to transmit A/N for each CB, for each CBG, for each TB, or for each plurality of TBs subjected to bundling of the UL signal.

The control section 301 is capable of being comprised of a controller, control circuit or control apparatus explained based on the common recognition in the technical field according to the present invention.

Based on instructions from the control section 301, the transmission signal generating section 302 generates DL signals (including at least one of DL data, DCI, DL reference signal and control information by higher layer signaling) to output to the mapping section 303.

The transmission signal generating section 302 is capable of being comprised of a signal generator, signal generating circuit or signal generating apparatus explained based on the common recognition in the technical field according to the present invention.

Based on instructions from the control section 301, the mapping section 303 maps the DL signal generated in the transmission signal generating section 302 to predetermined radio resources to output to the transmitting/receiving section 103. The mapping section 303 is capable of being comprised of a mapper, mapping circuit or mapping apparatus explained based on the common recognition in the technical field according to the present invention.

The received signal processing section 304 performs reception processing (e.g., demapping, demodulation, decoding, etc.) on the UL signal transmitted from the user terminal 20. For example, according to instructions from the control section 301, the received signal processing section 304 may perform decoding processing per-CB.

Further, the received signal processing section 304 may output the received signal and signal subjected to the reception processing to the measurement section 305. The measurement section 305 performs measurement on the received signal. The measurement section 305 is capable of being comprised of a measurement device, measurement circuit or measurement apparatus explained based on the common recognition in the technical field according to the present invention.

For example, the measurement section 305 may measure received power (e.g., RSRP (Reference Signal Received Power)), received quality (e.g., RSRQ (Reference Signal Received Quality)), channel state and the like of the received signal. The measurement result may be output to the control section 301.

<User Terminal>

Figure 15:
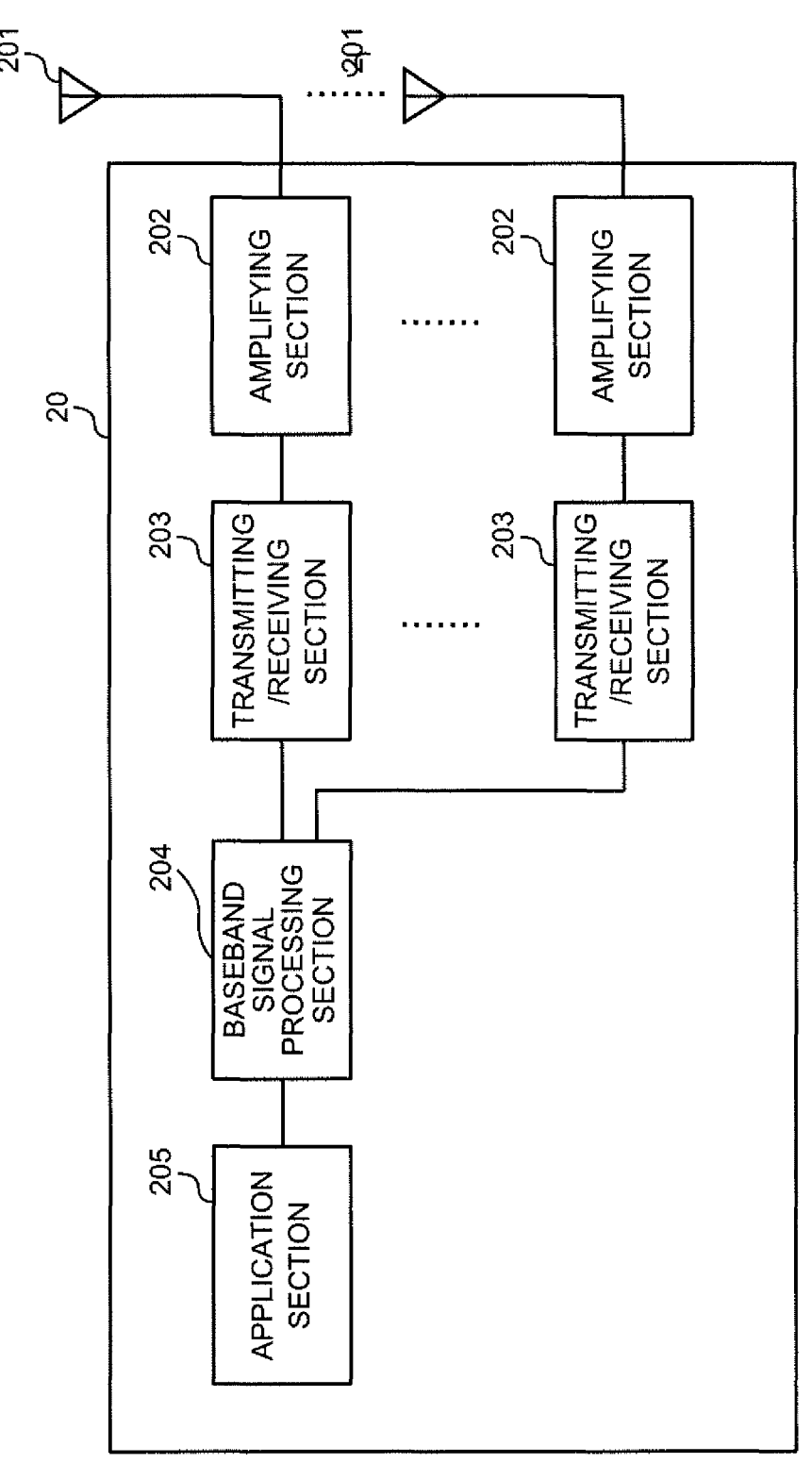
FIG. 15 is a diagram showing one example of an entire configuration of a user terminal according to this Embodiment.

FIG. 15 is a diagram showing one example of an entire configuration of the user terminal according to this Embodiment. The user terminal 20 is provided with a plurality of transmitting/receiving antennas 201 for MIMO transmission, amplifying sections 202, transmitting/receiving sections 203, baseband signal processing section 204, and application section 205.

Radio-frequency signals received in a plurality of transmitting/receiving antennas 201 are respectively amplified in the amplifying sections 202. Each of the transmitting/receiving sections 203 receives the DL signal amplified in the amplifying section 202. The transmitting/receiving section 203 performs frequency conversion on the received signal into a baseband signal to output to the baseband signal processing section 204.

The baseband signal processing section 204 performs FFT processing, error correcting decoding, reception processing of retransmission control and the like on the input baseband signal. DL data is transferred to the application section 205. The application section 205 performs processing concerning layers higher than the physical layer and MAC layer, and the like.

On the other hand, for UL data, the data is input to the baseband signal processing section 204 from the application section 205. The baseband signal processing section 204 performs, on the data, retransmission control processing (e.g., processing of HARQ), channel coding, rate matching, puncturing, Discrete Fourier Transform (DFT) processing, IFFT processing and the like to transfer to each of the transmitting/receiving sections 203. Also for UCI (e.g., at least one of A/N of a DL signal, channel state information (CSI) and scheduling request (SR), etc.), the section 204 performs channel coding, rete matching, puncturing, DFT processing, IFFT processing and the like to transfer to each of the transmitting/receiving sections 203.

Each of the transmitting/receiving sections 203 converts the baseband signal output from the baseband signal processing section 204 into a signal with a radio frequency band to transmit. The radio-frequency signals subjected to frequency conversion in the transmitting/receiving sections 203 are amplified in the amplifying sections 202, and are transmitted from the transmitting/receiving antennas 201, respectively.

Further, the transmitting/receiving section 203 receives a DL signal (e.g., at least one of DCI (DL assignment and/or UL grant, DL data and DL reference signal), and transmits a UL signal (e.g., at least one of UL data, UCI and UL reference signal).

Furthermore, the transmitting/receiving section 203 receives the receipt confirmation information (also referred to as A/N, HARQ-ACK, etc.) of a UL signal, and transmits A/N of a DL signal. As described above, a transmission unit of the A/N may be any of a CB-by-CB basis, CBG-by-CBG basis, TB-by-TB basis, and a basis of a plurality of TBs subjected to bundling. For example, the transmitting/receiving section 203 may receive at least one of the transmission unit information used in configuring one of a plurality of transmission units such as a CB-by-CB basis, CBG-by-CBG basis, TB-by-TB basis, and a basis of a plurality of TBs, the dynamic control information used in dynamic control of the transmission unit of A/N, and the number-of-CB information (number-of-CBG information) on the number of CBs (or the number of CBGs) per TB.

The transmitting/receiving section 203 is capable of being comprised of a transmitter/receiver, transmitting/receiving circuit or transmitting/receiving apparatus explained based on the common recognition in the technical field according to the present invention. In addition, the transmitting/receiving section 203 may be comprised as an integrated transmitting/receiving section, or may be comprised of a transmitting section and receiving section.

Figure 16:
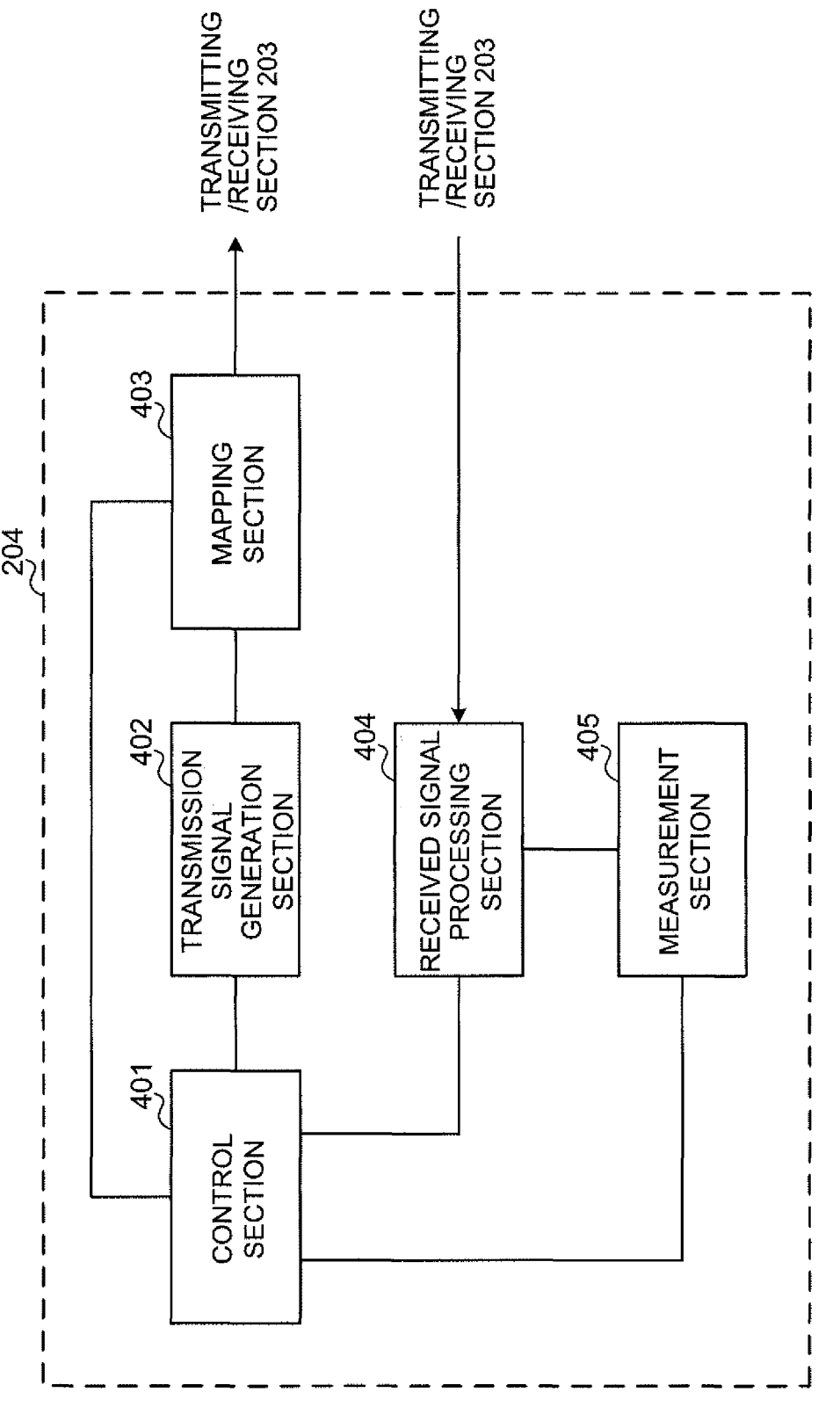
FIG. 16 is a diagram showing one example of a function configuration of the user terminal according to this Embodiment.

FIG. 16 is a diagram showing one example of a function configuration of the user terminal according to this Embodiment. In addition, FIG. 16 mainly illustrates function blocks of a characteristic portion in this Embodiment, and the user terminal 20 is assumed to have other function blocks required for radio communication. As shown in FIG. 16, the baseband signal processing section 204 that the user terminal 20 has is provided with a control section 401, transmission signal generating section 402, mapping section 403, received signal processing section 404, and measurement section 405.

The control section 401 performs control of the entire user terminal 20. For example, the control section 401 controls reception processing of DL signals by the received signal processing section 404, generation processing of DL signals by the transmission signal generating section 402, mapping of UL signals by the mapping section 403, and measurement by the measurement section 405.

Specifically, based on the DCI (DL assignment), the control section 401 controls reception processing (e.g., demodulation, decoding, etc.) of DL signals. For example, the control section 401 may control the received signal processing section 404 so as to demodulate a DL signal based on a modulation scheme indicated by an MCS index in the DCI. Further, the control section 401 may control the received signal processing section 404 so as to determine a TBS based on a TBS index indicated by the MCS index and the number of allocated resource blocks, and decode the DL signal based on the TBS.

Further, the control section 401 may control a transmission unit of A/N of a DL signal and/or a UL signal. For example, based on the transmission unit information subjected to higher layer signaling, the control section 401 may configure one of a plurality of transmission units (e.g., one of a plurality of transmission units such as CB, CBG, TB, and a plurality of TBs subjected to bundling) (Aspect 1).

Furthermore, based on the dynamic control information included in the DCI, the control section 401 may dynamically control the transmission unit of A/N of a DL signal. Specifically, also in the case where transmission of A/N for each CB (or for each CBG) is configured by higher layer signaling, based on the DCI for scheduling the DL signal, the control section 401 may control transmission of A/N for each TB (Aspect 2, first dynamic control).

Alternatively, also in the case where transmission of A/N for each CB (or for each CBG) is configured by higher layer signaling, based on the payload of a UL signal, the control section 401 may control transmission of A/N for each TB (Aspect 2, second dynamic control). Specifically, in the case where the number of A/N bits for each CB exceeds the UL signal, based on the TBS, the control section 401 may change A/N for each CB to A/N for each TB.

Further, in the case where the transmission unit of A/N of the DL signal and/or the UL signal is CB (or CBG), based on the number-of-CB information (or number-of-CBG information) on the number of CBs (or the number of CBGs) per TB, the control section 301 may control the transmission signal generating section 302 and mapping section 303 so as to generate an A/N bit for each CB or for each CBG (Aspect 3). The number-of-CB information (number-of-CBG information) may be the number of CBs (the number of CBGs) per TB configured by higher layer signaling (semi-static control), or may be a cumulative value of CBs (CBGs) within a predetermined time included in DCI (dynamic control).

Furthermore, based on at least one of the HARQ process number (HPN) in DCI, the retransmission CB identification information (e.g., index of each CB or each CBG), the information (e.g., NDI) indicating whether or not transmission is new transmission (retransmission), and the retransmission CB multiplexing information indicating whether or not the retransmission CB (or retransmission CBG) is multiplexed in the TB, the control section 401 may perform reception processing of the DL signal where the TB is segmented into a plurality of CBs (Aspect 4).

Still furthermore, in the case where the TB is segmented into a plurality of CBs, based on an error detection result of each CB, the control section 401 controls the transmission signal generating section 402 so as to generate A/N indicating A/N for each CB or for each CBG.

Moreover, based on the DCI (UL grant), the control section 401 controls generation and transmission processing (e.g., coding, modulation, mapping, etc.) of UL signals. For example, the control section 401 may control the transmission signal generating section 402 so as to modulate a UL signal based on a modulation scheme indicated by an MCS index in the DCI. Further, the control section 401 may control the transmission signal generating section 402 so as to determine a TBS based on a TBS index indicated by the MCS index and the number of allocated resource blocks, and encode the UL signal based on the TBS.

Further, in the case where the TBS exceeds a predetermined threshold, the control section 401 may apply code block segmentation for segmenting the TBS into a plurality of CBs to the UL signal. Alternatively, based on application instructions by higher layer signaling and/or DCI, the control section 401 may apply code block segmentation to the UL signal.

Furthermore, based on A/N for each CB (or for each CBG) from the radio base station 10, the control section 401 may control retransmission of each CB (or each CBG)

constituting the UL signal. Still furthermore, the control section 401 may control the transmission signal generating section 402 and mapping section 403 so as to transmit a retransmission CB (or retransmission CBG) without multiplexing with a new CB (or retransmission CBG). The control section 401 may control the transmission signal generating section 402 and mapping section 403 so as to multiplex a retransmission CB (or retransmission CBG) with a new CB (or retransmission CBG) to transmit.

The control section 401 is capable of being comprised of a controller, control circuit or control apparatus explained based on the common recognition in the technical field according to the present invention.

Based on instructions from the control section 401, the transmission signal generating section 402 generates (e.g., performs coding, rate matching, puncturing, modulation, etc. on) UL signals and receipt confirmation information of DL signals to output to the mapping section 403. The transmission signal generating section 402 is capable of being comprised of a signal generator, signal generating circuit or signal generating apparatus explained based on the common recognition in the technical field according to the present invention.

Based on instructions from the control section 401, the mapping section 403 maps the UL signal and receipt confirmation information of the DL signal generated in the transmission signal generating section 402 to radio resources to output to the transmitting/receiving section 203. The mapping section 403 is capable of being comprised of a mapper, mapping circuit or mapping apparatus explained based on the common recognition in the technical field according to the present invention.

The received signal processing section 404 performs reception processing (e.g., demapping, demodulation, decoding, etc.) on the DL signal. For example, according to instructions from the control section 401, the received signal processing section 404 may perform decoding processing per-CB, and may output a decoding result of each CB to the control section 401.

The received signal processing section 404 outputs the information received from the radio base station 10 to the control section 401. For example, the received signal processing section 404 outputs, to the control section 401, the broadcast information, system information, higher layer signaling information by higher layer signaling such as RRC signaling, L1/L2 control information (e.g., UL grant, DL assignment), and the like.

The received signal processing section 404 is capable of being comprised of a signal processor, signal processing circuit or signal processing apparatus explained based on the common recognition in the technical field according to the present invention. Further, the received signal processing section 404 is capable of constituting the receiving section according to the present invention.

Based on a reference signal (e.g., CSI-RS) from the radio base station 10, the measurement section 405 measures a channel state, and outputs the measurement result to the control section 401. In addition, measurement of the channel state may be performed for each CC.

The measurement section 405 is capable of being comprised of a signal processing device, signal processing circuit or signal processing apparatus and a measurement device, measurement circuit or measurement apparatus explained based on the common recognition in the technical field according to the present invention.

<Hardware Configuration>

In addition, the block diagrams used in explanation of the above-mentioned Embodiment show blocks on a function-by-function basis. These function blocks (configuration sections) are actualized by any combination of hardware and/or software. Further, the means for actualizing each function block is not limited particularly. In other words, each function block may be actualized by a single apparatus combined physically and/or logically, or two or more apparatuses that are separated physically and/or logically are connected directly and/or indirectly (e.g., by cable and/or radio), and each function block may be actualized by a plurality of these apparatuses.

Figure 17:
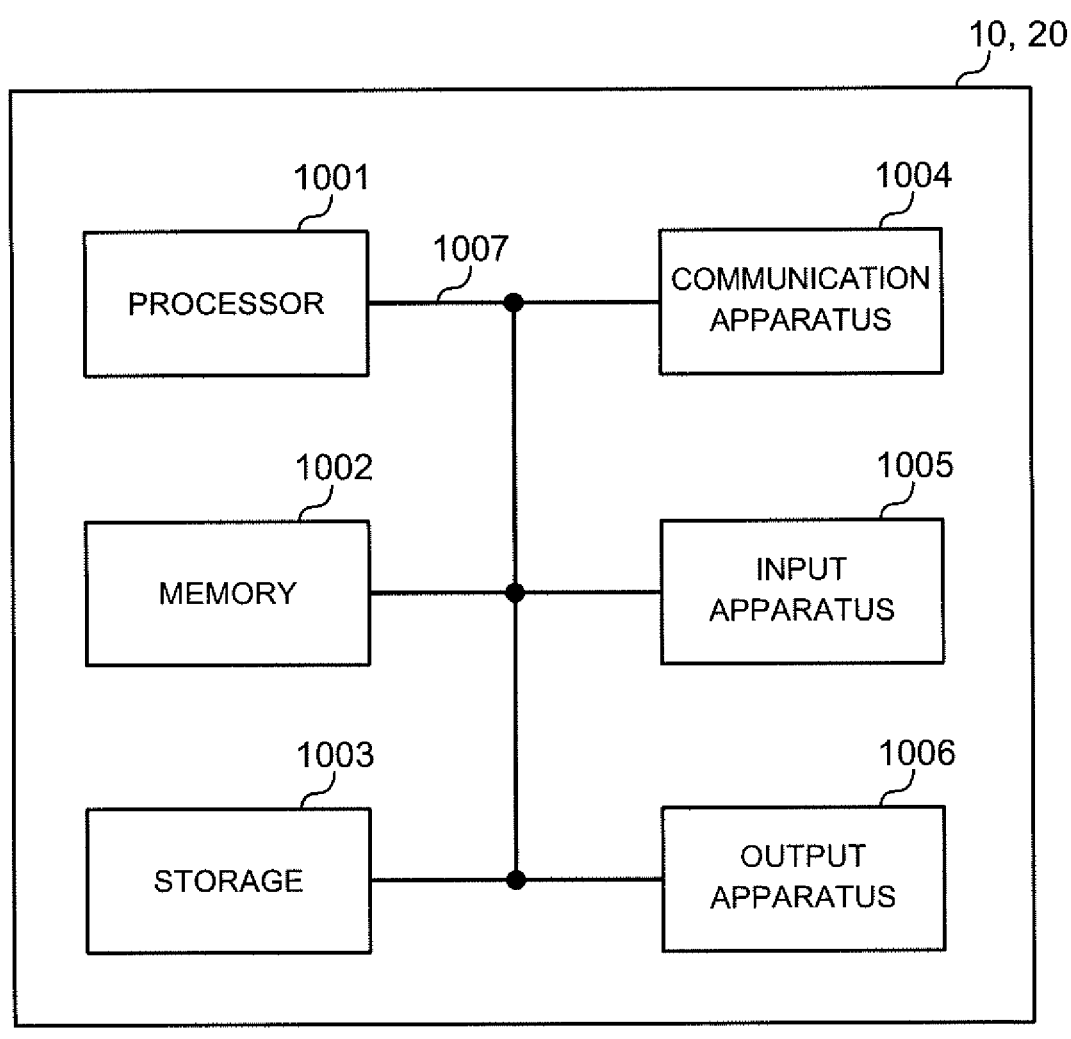
FIG. 17 is a diagram showing one example of hardware configurations of the radio base station and user terminal according to this Embodiment.

For example, each of the radio base station, user terminal and the like in this Embodiment may function as a computer that performs the processing of the radio communication method of the present invention. FIG. 17 is a diagram showing one example of a hardware configuration of each of the radio base station and user terminal according to this Embodiment. Each of the radio base station 10 and user terminal 20 as described above may be physically configured as a computer apparatus including a processor 1001, memory 1002, storage 1003, communication apparatus 1004, input apparatus 1005, output apparatus 1006, bus 1007 and the like.

In addition, in the following description, it is possible to replace the letter of "apparatus" with a circuit, device, unit and the like to read. With respect to each apparatus shown in the figure, the hardware configuration of each of the radio base station 10 and the user terminal 20 may be configured so as to include one or a plurality of apparatuses, or may be configured without including a part of apparatuses.

For example, a single processor 1001 is shown in the figure, but a plurality of processors may exist. Further, the processing may be executed by a single processor, or may be executed by one or more processors at the same time, sequentially or by another technique. In addition, the processor 1001 may be implemented on one or more chips.

For example, each function in the radio base station 10 and user terminal 20 is actualized in a manner such that predetermined software (program) is read on the hardware of the processor 1001, memory 1002 and the like, and that the processor 1001 thereby performs computations, and controls communication by the communication apparatus 1004, and read and/or write of data in the memory 1002 and storage 1003.

For example, the processor 1001 operates an operating system to control the entire computer. The processor 1001 may be comprised of a Central Processing Unit (CPU) including interfaces with peripheral apparatuses, control apparatus, computation apparatus, register and the like. For example, the above-mentioned baseband signal processing section 104 (204), call processing section 105 and the like may be actualized by the processor 1001.

Further, the processor 1001 reads the program (program code), software module, data and the like on the memory 1002 from the storage 1003 and/or the communication apparatus 1004, and according thereto, executes various kinds of processing. Used as the program is a program that causes the computer to execute at least a part of operation described in the above-mentioned Embodiment. For example, the control section 401 of the user terminal 20 may be actualized by a control program stored in the memory 1002 to operate in the processor 1001, and the other function blocks may be actualized similarly.

The memory 1002 is a computer-readable storage medium, and for example, may be comprised of at least one of ROM (Read Only Memory), EPROM (Erasable Programmable ROM), EEPROM (Electrically EPROM), RAM (Random Access Memory) and other proper storage media. The memory 1002 may be called the register, cache, main memory (main storage apparatus) and the like. The memory 1002 is capable of storing the program (program code), software module and the like executable to implement the radio communication method according to one Embodiment of the present invention.

The storage 1003 is a computer-readable storage medium, and for example, may be comprised of at least one of a flexible disk, floppy (Registered Trademark) disk, magneto-optical disk (e.g., compact disk (CD-ROM (Compact Disc ROM), etc.), digital multi-purpose disk, Blu-ray (Registered Trademark) disk), removable disk, hard disk drive, smart card, flash memory device (e.g., card, stick, key drive), magnetic stripe, database, server and other proper storage media. The storage 1003 may be called an auxiliary storage apparatus.

The communication apparatus 1004 is hardware (transmitting/receiving device) to perform communication between computers via a wired and/or wireless network, and for example, is also referred to as a network device, network controller, network card, communication module and the like. For example, in order to actualize Frequency Division Duplex (FDD) and/or Time Division Duplex (TDD), the communication apparatus 1004 may be comprised by including a high-frequency switch, duplexer, filter, frequency synthesizer and the like.

For example, the transmitting/receiving antenna 101 (201), amplifying section 102 (202), transmitting/receiving section 103 (203), communication path interface 106 and the like as described above may be actualized by the communication apparatus 1004.

The input apparatus 1005 is an input device (e.g., keyboard, mouse, microphone, switch, button, sensor, etc.) that receives input from the outside. The output apparatus 1006 is an output device (e.g., display, speaker, LED (Light Emitting Diode) lamp, etc.) that performs output to the outside. In addition, the input apparatus 1005 and output apparatus 1006 may be an integrated configuration (e.g., touch panel).

Further, each apparatus of the processor 1001, memory 1002 and the like is connected on the bus 1007 to communicate information. The bus 1007 may be comprised of a single bus, or may be comprised of different buses between apparatuses.

Furthermore, each of the radio base station 10 and user terminal 20 may be configured by including hardware such as a microprocessor, Digital Signal Processor (DSP), ASIC (ApplicatioN Specific Integrated Circuit), PLD (Programmable Logic Device), and FPGA (Field Programmable Gate Array), or a part or the whole of each function block may be actualized by the hardware. For example, the processor 1001 may be implemented by at least one of the hardware.

(Modification)

In addition, the term explained in the present Description and/or the term required to understand the present Description may be replaced with a term having the same or similar meaning. For example, the channel and/or the symbol may be a signal (signaling). Further, the signal may be a message. The reference signal is capable of being abbreviated as RS (Reference Signal), and according to the standard to apply, may be called a pilot, pilot signal and the like. Furthermore, a component carrier (CC) may be called a cell, frequency carrier, carrier frequency and the like.

Further, the radio frame may be comprised of one or a plurality of frames in the time domain. The one or each of the plurality of frames constituting the radio frame may be called a subframe. Furthermore, the subframe may be comprised of one or a plurality of slots in the time domain. The subframe may be a fixed time length (e.g., 1 ms) that is not dependent on numerology.

Furthermore, the slot may be comprised of one or a plurality of symbols (OFDM (Orthogonal Frequency Division Multiplexing) symbols, SC-FDMA (Single Carrier Frequency Division Multiple Access) symbols and the like) in the time domain. Still furthermore, the slot may a time unit based on numerology. Moreover, the slot may include a plurality of mini-slots. Each mini-slot may be comprised of one or a plurality of symbols in the time domain.

Each of the radio frame, subframe, slot, mini-slot and symbol represents a time unit in transmitting a signal. For the radio frame, subframe, slot, mini-slot and symbol, another name corresponding to each of them may be used. For example, one subframe may be called Transmission Time Interval (TTI), a plurality of contiguous subframes may be called TTI, or one slot or one mini-slot may be called TTI. In other words, the subframe and TTI may be the subframe (1 ms) in existing LTE, may be a frame (e.g., 1 to 13 symbols) shorter than 1 ms, or may be a frame longer than 1 ms.

Herein, for example, the TTI refers to a minimum time unit of scheduling in radio communication. For example, in the LTE system, the radio base station performs scheduling for allocating radio resources (frequency bandwidth, transmit power and the like capable of being used in each user terminal) to each user terminal in a TTI unit. In addition, the definition of the TTI is not limited thereto. The TTI may be a transmission time unit of a data packet (transport block) subjected to channel coding, or may be a processing unit of scheduling, link adaptation and the like. In addition, when one slot or one mini-slot is called the TTI, one or more TTIs (i.e., one or more slots, or one or more mini-slots) may be the minimum time unit of scheduling. Further, the number of slots (the number of mini-slots) constituting the minimum time unit of scheduling may be controlled.

The TTI having a time length of 1 ms may be called ordinary TTI (TTI in LTE Rel.8-12), normal TTI, long III, ordinary subframe, normal subframe, long subframe or the like. The TTI shorter than the ordinary TTI may be called reduced TTI, short TTI, partial or fractional III, reduced subframe, short subframe or the like.

The resource block (RB) is a resource allocation unit in the time domain and frequency domain, and may include one or a plurality of contiguous subcarriers in the frequency domain. Further, the RB may include one or a plurality of symbols in the time domain, and may be a length of 1 slot, 1 mini-slot, 1 subcarrier, or 1 TTI. Each of 1 TTI and 1 subframe may be comprised of one or a plurality of resource blocks. In addition, The RB may be called a physical resource block (PRB: Physical RB), PRB pair, RB pair and the like.

Further, the resource block may be comprised of one or a plurality of resource elements (RE: Resource Element). For example, 1 RE may be a radio resource region of 1 subcarrier and 1 symbol.

In addition, structures of the above-mentioned radio frame, subframe, slot, mini-slot, symbol and the like are only illustrative. For example, it is possible to modify, in various manners, configurations of the number of subframes included in the radio frame, the number of slots per subframe or radio frame, the number of mini-slots included inside the slot, the number of symbols included in the slot or mini-slot, the number of subcarriers included in the RB, the number of symbols within the TTI, the symbol length, the cyclic prefix (CP) length and the like.

Further, the information, parameter and the like explained in the present Description may be expressed by an absolute value, may be expressed by a relative value from a predetermined value, or may be expressed by another corresponding information. For example, the radio resource may be indicated by a predetermined index. Further, equations using these parameters and the like may be different from those explicitly disclosed in the present Description.

The names used in the parameter and the like in the present Description are not restrictive in any respects. For example, it is possible to identify various channels (PUCCH (Physical Uplink Control Channel), PDCCH (Physical Downlink Control Channel) and the like) and information elements, by any suitable names, and therefore, various names assigned to these various channels and information elements are not restrictive in any respects.

The information, signal and the like explained in the present Description may be represented by using any of various different techniques. For example, the data, order, command, information, signal, bit, symbol, chip and the like capable of being described over the entire above-mentioned explanation may be represented by voltage, current, electromagnetic wave, magnetic field or magnetic particle, optical field or photon, or any combination thereof.

Further, the information, signal and the like are capable of being output from a higher layer to a lower layer, and/or from the lower layer to the higher layer. The information, signal and the like may be input and output via a plurality of network nodes.

The input/output information, signal and the like may be stored in a particular place (e.g., memory), or may be managed with a management table. The input/output information, signal and the like are capable of being rewritten, updated or edited. The output information, signal and the like may be deleted. The input information, signal and the like may be transmitted to another apparatus.

Notification of the information is not limited to the Aspects/Embodiment described in the present Description, and may be performed by another method. For example, notification of the information may be performed using physical layer signaling (e.g., Downlink Control Information (DCI), Uplink Control Information (UCI)), higher layer signaling (e.g., RRC (Radio Resource Control) signaling, broadcast information (Master Information Block (MIB), System Information Block (SIB) and the like), MAC (Medium Access Control) signaling), other signals, or combination thereof.

In addition, the physical layer signaling may be called L1/L2 (Layer 1/Layer 2) control information (L1/L2 control signal), L1 control information (L1 control signal) and the like. Further, the RRC signaling may be called RRC message, and for example, may be RRC connection setup (RRC Connection Setup) message, RRC connection reconfiguration (RRC Connection Reconfiguration) message, and the like. Furthermore, for example, the MAC signaling may be notified by MAC Control Element (MAC CE).

Further, notification of predetermined information (e.g., notification of "being X") is not limited to notification that is performed explicitly, and may be performed implicitly (e.g., notification of the predetermined information is not performed, or by notification of different information).

The decision may be made with a value ("0" or "1") expressed by 1 bit, may be made with a Boolean value represented by true or false, or may be made by comparison with a numerical value (e.g., comparison with a predetermined value).

Irrespective of that the software is called software, firmware, middle-ware, micro-code, hardware descriptive term, or another name, the software should be interpreted widely to mean a command, command set, code, code segment, program code, program, sub-program, software module, application, software application, software package, routine, sub-routine, object, executable file, execution thread, procedure, function and the like.

Further, the software, command, information and the like may be transmitted and received via a transmission medium. For example, when the software is transmitted from a website, server or another remote source using wired techniques (coaxial cable, optical fiber cable, twisted pair, Digital Subscriber Line (DSL) and the like) and/or wireless techniques (infrared, microwave and the like), these wired techniques and/or wireless techniques are included in the definition of the transmission medium.

The terms of "system" and "network" used in the present Description are used interchangeably.

In the present Description, the terms of "Base Station (BS)", "radio base station", "eNB", "gNB", "cell", "sector", "cell group", "carrier" and "component carrier" are capable of being used interchangeably. There is the case where the base station is called by the terms of fixed station, NodeB, eNodeB (eNB), access point, transmission point, reception point, femto-cell, small cell and the like.

The base station is capable of accommodating one or a plurality of (e.g., three) cells (also called the sector). When the base station accommodates a plurality of cells, the entire coverage area of the base station is capable of being divided into a plurality of smaller areas, and each of the smaller areas is also capable of providing communication services by a base station sub-system (e.g., small base station (RRH: Remote Radio Head) for indoor use). The term of "cell" or "sector" refers to a part or the whole of coverage area of the base station and/or base station sub-system that performs communication services in the coverage.

In the present Description, the terms of "Mobile Station (MS)", "user terminal", "User Equipment (UE)", and "terminal" are capable of being used interchangeably. There is the case where the base station is called by the terms of fixed station, NodeB, eNodeB (eNB), access point, transmission point, reception point, femto-cell, small cell and the like.

There is the case where the Mobile Station may be called using a subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client, or some other suitable terms, by a person skilled in the art.

Further, the radio base station in the present Description may be read with the user terminal. For example, each Aspect/Embodiment of the present invention may be applied to a configuration where communication between the radio base station and the user terminal is replaced with communication among a plurality of user terminals (D2D: Device-to-Device). In this case, the functions that the above-mentioned radio base station 10 has may be the configuration that the user terminal 20 has. Further, the words of "up", "down" and the like may be read with "side". For example, the uplink channel may be read with a side channel.

Similarly, the user terminal in the present Description may be read with the radio base station. In this case, the functions that the above-mentioned user terminal 20 has may be the configuration that the radio base station 10 has.

In the present Description, particular operation performed by the base station may be performed by an upper node thereof in some case. In a network comprised of one or a plurality of network nodes having the base station, it is obvious that various operations performed for communication with the terminal are capable of being performed by the base station, one or more network nodes (e.g., MME (Mobility Management Entity), S-GW (Serving-Gateway) and the like are considered, but the invention is not limited thereto) except the base station, or combination thereof.

Each Aspect/Embodiment explained in the present Description may be used alone, may be used in combination, or may be switched and used according to execution. Further, with respect to the processing procedure, sequence, flowchart and the like of each Aspect/Embodiment explained in the present Description, unless there is a contradiction, the order may be changed. For example, with respect to the methods explained in the present Description, elements of various steps are presented in illustrative order, and are not limited to the presented particular order.

Each Aspect/Embodiment explained in the present Description may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), EX (Future generation radio access), GSM (Registered Trademark) (Global System for Mobile communications), CDMA 2000, UMB (Ultra Mobile Broadband), IEEE 802.11 (Wi-Fi (Registered Trademark)), IEEE 802.16 (WiMAX (Registered Trademark)), IEEE 802.20, UWB (Ultra-WideBand), Bluetooth (Registered Trademark), system using another proper radio communication method and/or the next-generation system extended based thereon.

The description of "based on" used in the present Description does not mean "based on only", unless otherwise specified. In other words, the description of "based on" means both of "based on only" and "based on at least".

Any references to elements using designations of "first", "second" and the like used in the present Description are not intended to limit the amount or order of these elements overall.

These designations are capable of being used in the present Description as the useful method to distinguish between two or more elements. Accordingly, references of first and second elements do not mean that only two elements are adopted, or that the first element should be prior to the second element in any manner.

There is the case where the term of "determining" used in the present Description includes various types of operation. For example, "determining" may be regarded as "determining" calculating, computing, processing, deriving, investigating, looking up (e.g., search in a table, database or another data structure), ascertaining and the like. Further, "determining" may be regarded as "determining" receiving (e.g., receiving information), transmitting (e.g., transmitting information), input, output, accessing (e.g., accessing data in memory) and the like. Furthermore, "determining" may be regarded as "determining" resolving, selecting, choosing, establishing, comparing and the like. In other words, "determining" may be regarded as "determining" some operation.

The terms of "connected" and "coupled" used in the present Description or any modifications thereof mean direct or indirect every connection or coupling among two or more elements, and are capable of including existence of one or more intermediate elements between two mutually "connected" or "coupled" elements. Coupling or connection between elements may be physical, may be logical or may be combination thereof. In the case of using in the present Description, it is possible to consider that two elements are mutually "connected" or "coupled", by using one or more electric wires, cable and/or print electric connection, and as some non-limited and non-inclusive examples, electromagnetic energy such as electromagnetic energy having wavelengths in a radio frequency region, microwave region and light (both visible and invisible) region.

In the case of using "including", "comprising" and modifications thereof in the present Description or the scope of the claims, as in the term of "provided with", these terms are intended to be inclusive. Further, the term of "or" used in the present Description or the scope of the claims is intended to be not exclusive OR.

As described above, the present invention is described in detail, but it is obvious to a person skilled in the art that the invention is not limited to the Embodiment described in the present Description. The invention is capable of being carried into practice as modified and changed aspects without departing from the subject matter and scope of the invention defined by the descriptions of the scope of the claims. Accordingly, the descriptions of the present Description are intended for illustrative explanation, and do not have any restrictive meaning to the invention.

The disclosure of Japanese Patent Application No. 2016-212065, filed on Oct. 28, 2016, including the specification, drawings, and abstract, is incorporated herein by reference in its entirety.

The invention claimed is:

1. A terminal comprising:
a receiver that receives a downlink (DL) signal comprised of a transport block including a plurality of code block groups; and
a processor that controls transmission of receipt confirmation information per code block group for the DL signal,
wherein in response to transmission of the receipt confirmation information for each code block group being configured by Radio Resource Control (RRC) signaling and the receiver receiving a given downlink control information (DCI) for scheduling the DL signal, the processor controls transmission of the receipt confirmation information for each transport block rather than for each code block group,
wherein in response to a HARQ-ACK codebook being configured to be semi-static, the processor controls transmission of the receipt confirmation information for each code block group, based on a number of code block groups, which are obtained by grouping a plurality of code blocks, per transport block configured by the RRC signaling, and
wherein the DCI includes information indicating whether scheduled DL signal transmission is new transmission or retransmission, and when the information indicates the DL signal transmission is retransmission, the DCI includes information indicating a code block group to retransmit.

2. The terminal according to claim 1, wherein the processor controls transmission of the receipt confirmation information for each code block group, based on downlink assignment indicator (DAI) included in the DCI.

3. A radio communication method for a terminal, comprising:

receiving a downlink (DL) signal comprised of a transport block including a plurality of code block groups; and controlling transmission of receipt confirmation information per code block group for the DL signal, wherein in response to transmission of the receipt confirmation information for each code block group being configured by Radio Resource Control (RRC) signaling and the terminal receiving a given downlink control information (DCI) for scheduling the DL signal, the terminal controls transmission of the receipt confirmation information for each transport block rather than for each code block group, wherein in response to a HARQ-ACK codebook being configured to be semi-static, the terminal controls transmission of the receipt confirmation information for each code block group, based on a number of code block groups, which are obtained by grouping a plurality of code blocks, per transport block configured by the RRC signaling, and wherein the DCI includes information indicating whether scheduled DL signal transmission is new transmission or retransmission, and when the information indicates the DL signal transmission is retransmission, the DCI includes information indicating a code block group to retransmit.

4. A base station comprising:

a transmitter that transmits a downlink (DL) signal comprised of a transport block including a plurality of code block groups; and a receiver that receives receipt confirmation information per code block group for the DL signal, wherein in response to transmission of the receipt confirmation information for each code block group being configured by Radio Resource Control (RRC) signaling and the transmitter transmitting a given downlink control information (DCI) for scheduling the DL signal, the receiver receives the receipt confirmation information for each transport block rather than for each code block group, wherein in response to a HARQ-ACK codebook being configured to be semi-static, the receiver receives the receipt confirmation information for each code block group, transmitted based on a number of code block groups, which are obtained by grouping a plurality of code blocks, per transport block configured by the RRC signaling, and wherein the DCI includes information indicating whether scheduled DL signal transmission is new transmission or retransmission, and when the information indicates the DL signal transmission is retransmission, the DCI includes information indicating a code block group to retransmit.

5. A system comprising a base station and a terminal, wherein:

the base station comprises:

a transmitter that transmits a downlink (DL) signal comprised of a transport block including a plurality of code block groups; and the terminal comprises:

a receiver that receives the DL signal; and a processor that controls transmission of receipt confirmation information per code block group for the DL signal, wherein in response to transmission of the receipt confirmation information for each code block group being configured by Radio Resource Control (RRC) signaling and the receiver receiving a given downlink control information (DCI) for scheduling the DL signal, the processor controls transmission of the receipt confirmation information for each transport block rather than for each code block group, wherein in response to a HARQ-ACK codebook being configured to be semi-static, the processor controls transmission of the receipt confirmation information for each code block group, based on a number of code block groups, which are obtained by grouping a plurality of code blocks, per transport block configured by the RRC signaling, and wherein the DCI includes information indicating whether scheduled DL signal transmission is new transmission or retransmission, and when the information indicates the DL signal transmission is retransmission, the DCI includes information indicating a code block group to retransmit.

* * * * *